US012233728B2

United States Patent
Potentas et al.

(10) Patent No.: US 12,233,728 B2
(45) Date of Patent: Feb. 25, 2025

(54) CONVEYOR ARRANGEMENT FOR AERIAL VEHICLES

(71) Applicant: Telefonaktiebolaget LM Ericsson (publ), Stockholm (SE)

(72) Inventors: Wojciech Potentas, Lodz (PL); Grzegorz Bem, Lodz (PL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 88 days.

(21) Appl. No.: 18/030,885

(22) PCT Filed: Oct. 8, 2020

(86) PCT No.: PCT/EP2020/078340
§ 371 (c)(1),
(2) Date: Apr. 7, 2023

(87) PCT Pub. No.: WO2022/073616
PCT Pub. Date: Apr. 14, 2022

(65) Prior Publication Data
US 2023/0373664 A1      Nov. 23, 2023

(51) Int. Cl.
*B60L 53/18*    (2019.01)
*B60L 53/80*    (2019.01)
(Continued)

(52) U.S. Cl.
CPC .............. *B60L 53/18* (2019.02); *B60L 53/80* (2019.02); *B64U 50/34* (2023.01); *B64U 50/39* (2023.01);
(Continued)

(58) Field of Classification Search
None
See application file for complete search history.

(56) References Cited

U.S. PATENT DOCUMENTS 3,730,330 A      5/1973   De Good
9,815,633 B1 *  11/2017   Kisser ................... G01M 17/00
(Continued)

FOREIGN PATENT DOCUMENTS

CN          102910409 A      2/2013
CN          203127592 U      8/2013
(Continued)

OTHER PUBLICATIONS

International Search Report and Written Opinion of the International Searching Authority, PCT/EP2020/078340, mailed Jun. 14, 2021, 16 pages.
(Continued)

*Primary Examiner* — Kavel Singh
(74) *Attorney, Agent, or Firm* — Sage Patent Group

(57) ABSTRACT

A conveyor arrangement for airborne battery replacement between an aerial supply vehicle having a store of replacement batteries suitable to power electric aerial vehicles and an electric aerial vehicle powered by a set of replaceable batteries is disclosed. The conveyor arrangement is configured to convey batteries between the aerial supply vehicle and the electric aerial vehicle during flight to replace a replaceable battery from the set of the electric aerial vehicle by a replacement battery from the store of the aerial supply vehicle.

20 Claims, 21 Drawing Sheets

(51) Int. Cl.
*B64U 50/34* (2023.01)
*B64U 50/39* (2023.01)
*B64U 101/60* (2023.01)
*B65G 13/04* (2006.01)

(52) U.S. Cl.
CPC .......... *B65G 13/04* (2013.01); *B60L 2200/10* (2013.01); *B64U 2101/60* (2023.01)

(56) References Cited

U.S. PATENT DOCUMENTS

| | | | |
|---|---|---|---|
| 9,873,408 B2* | 1/2018 | Capizzo | G05D 1/12 |
| 10,081,495 B2* | 9/2018 | Møller | B65G 35/06 |
| 10,230,315 B2* | 3/2019 | Ramezani | B65G 21/14 |
| 10,346,789 B1 | 7/2019 | Berg et al. | |
| 11,374,415 B2* | 6/2022 | Schweitzer | B64F 5/40 |
| 12,049,328 B2* | 7/2024 | Sweeny | B64U 80/70 |
| 12,049,333 B2* | 7/2024 | Rose | B64U 50/34 |
| 2017/0015515 A1 | 1/2017 | Suzuki | |
| 2017/0327091 A1 | 11/2017 | Capizzo | |
| 2019/0315235 A1 | 10/2019 | Kung | |

FOREIGN PATENT DOCUMENTS

| | | | | |
|---|---|---|---|---|
| CN | 104627600 A | | 5/2015 | |
| CN | 206217861 U | * | 6/2017 | ............... B60S 5/06 |
| CN | 209536142 U | | 10/2019 | |
| CN | 209635168 U | | 11/2019 | |
| CN | 111099329 A | | 5/2020 | |
| CN | 111674822 A | | 9/2020 | |
| CN | 211544801 U | | 9/2020 | |
| DE | 20316236 U1 | | 2/2004 | |
| EP | 3663126 A1 | | 6/2020 | |
| FR | 2540841 A1 | | 8/1984 | |
| GB | 1177763 A | | 1/1970 | |
| WO | 9731843 A1 | | 9/1997 | |
| WO | 2019069057 A1 | | 4/2019 | |

OTHER PUBLICATIONS

Bauer, Winfried, "On the Way to Networked Internet Logistics," Downloaded from the Internet on Jun. 2, 2021: https://www.foerdern-und-heben.de/auf-dem-weg-zur-vernetzten-intralogistik/, 9 pages (including English translation).

Gizmodo, "Flying Replacement Batteries Could Massively Boost a Drone's Flight Time," Accessed on the Internet on Feb. 20, 2023 at: https://gizmodo.com/flying-replacement-batteries-could-massively-boost-a-dr-1838627300, 6 pages.

The Verge, by Popper, Ben (Source AIROBOTICS), "Watch this robotic arm swap fresh batteries into an autonomous drone," Accessed on the Internet on Feb. 20, 2023 at: https://www.theverge.com/2016/6/21/11989734/watch-this-robotic-arm-swap-fresh-batteries-into-an-autonomous-drone, 5 pages.

Spaceflight Now, by Clark, Stephen, "Astronauts complete extra work in series of battery upgrade spacewalks," Accessed on the Internet on Feb. 20, 2023 at: https://spaceflightnow.com/2019/10/06/iss-eva-56/, 8 pages.

* cited by examiner

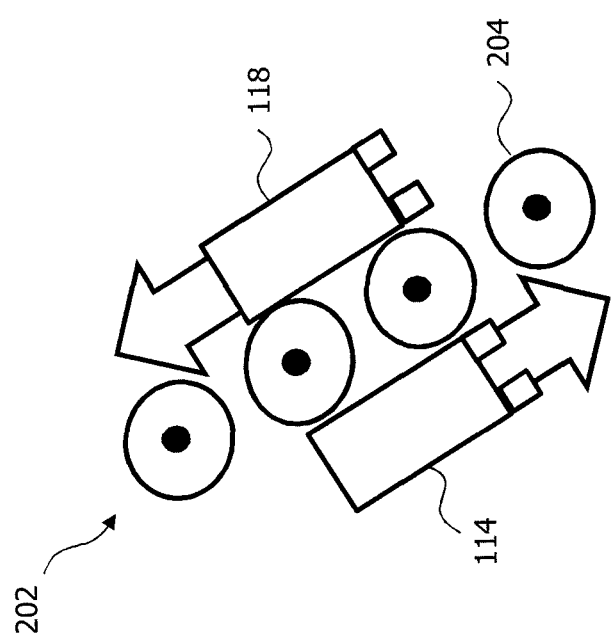

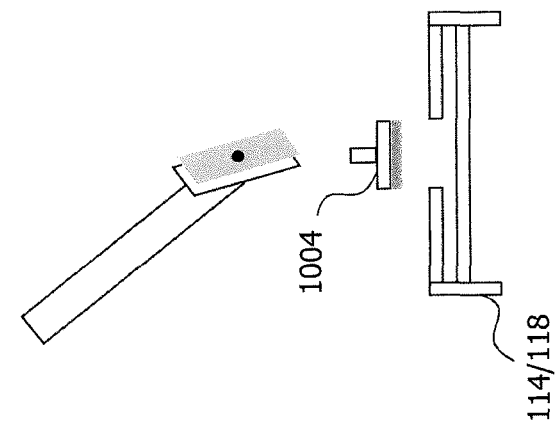
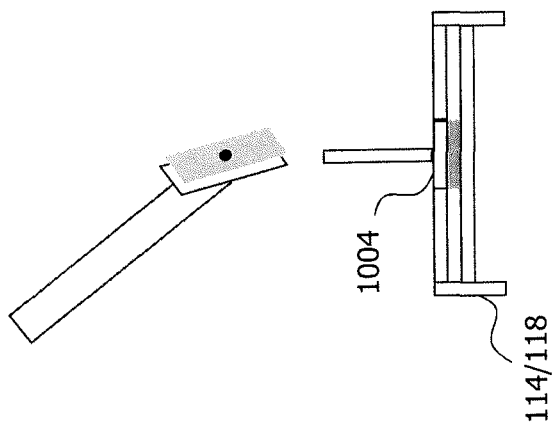
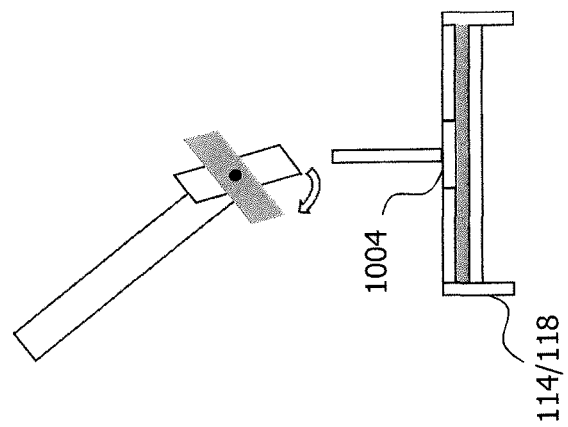
Fig. 12

CONVEYOR ARRANGEMENT FOR AERIAL VEHICLES

CROSS REFERENCE TO RELATED APPLICATIONS

This application is a 35 U.S.C. § 371 national stage application of PCT International Application No. PCT/EP2020/078340 filed on Oct. 8, 2020, the disclosure and content of which is incorporated by reference herein in its entirety.

TECHNICAL FIELD

The present disclosure generally relates to aerial vehicles. In particular, a conveyor arrangement for airborne battery replacement between an aerial supply vehicle having a store of replacement batteries suitable to power electric aerial vehicles and an electric aerial vehicle powered by a set of replaceable batteries is presented. The present disclosure also relates to a corresponding system, an aerial supply vehicle and an electric aerial vehicle.

BACKGROUND

In the aircraft industry, it is generally known to employ refueling technologies that allow refueling an aircraft during flight. To this end, large fuel supply aircrafts are typically employed, wherein an aircraft to be refueled is controlled to fly in synchronized velocity and direction with the supply aircraft—usually in a position slightly below and behind the supply aircraft—so that a pipe may be extended from the supply aircraft to connect to the aircraft during flight to thereby refuel the aircraft by supplying liquid fuel from a fuel reservoir of the supply aircraft through the pipe to the aircraft for some time.

Nowadays, there is a trend to employ aerial vehicles that use other drive technologies, i.e., non-fuel based drive technologies, especially in the case of unmanned aerial vehicles (UAVs). Drones, for example, are in many cases electrically driven, wherein the electric energy required to drive respective electric motors is supplied by onboard batteries carried by the drones. Today, drones are used for numerous applications, such as for surveillance, peacekeeping, scientific research and commercial uses, including uses in agriculture, logistics, aerial photography, or the like. A more recent application of drones also involves the use as so called drone base stations (DBSs), i.e., as UAVs carrying radio base stations (RBSs) used to extend the coverage of a mobile communication network to remote areas which are not covered by the network's terrestrial RBSs, for example. The above conventional refueling technologies are not applicable to such kinds of electrically driven UAVs, however, and, as a consequence, electric aerial vehicles are today typically limited in their flight range because, when the onboard batteries become discharged, these vehicles will need to fly back to a maintenance center on the ground, where batteries can be recharged for the next turn.

SUMMARY

Accordingly, there is a need for a technique that allows extending the flight range of electric aerial vehicles.

According to a first aspect, a conveyor arrangement for airborne battery replacement between an aerial supply vehicle having a store of replacement batteries suitable to power electric aerial vehicles and an electric aerial vehicle powered by a set of replaceable batteries is provided. The conveyor arrangement is configured to convey batteries between the aerial supply vehicle and the electric aerial vehicle during flight to replace a replaceable battery from the set of the electric aerial vehicle by a replacement battery from the store of the aerial supply vehicle.

The electric aerial vehicle may be a UAV, optionally a drone carrying an RBS. The conveyor arrangement may be attachable to the aerial supply vehicle and extendable towards the electric aerial vehicle to dock the electric aerial vehicle to the aerial supply vehicle during flight. The conveyor arrangement may comprise a power line connectable between the aerial supply vehicle and the electric aerial vehicle during flight to supply the electric aerial vehicle with power from the aerial supply vehicle while performing battery replacement.

The conveyor arrangement may comprise a plurality of rollers subsequently arranged to form a flexible conveyor on which batteries can be conveyed. One side of the conveyor may be used to convey batteries from the aerial supply vehicle to the electric aerial vehicle and the opposite side of the conveyor may be used to convey batteries from the electric aerial vehicle to the aerial supply vehicle. At least some of the plurality of rollers may be driven using a gearwheel arrangement, optionally driven by a plurality of motors arranged along the conveyor. At least some gearwheels of the gearwheel arrangement may be driven by force stimulated motors that are activated depending on a load applied on the conveyor. The conveyor arrangement may comprise at least one amplifier power circuit to amplify electric control signals delivered to motors that are distant over a threshold distance. The conveyor arrangement may comprise an additional plurality of rollers subsequently arranged to form an at least two-sided conveyor with the plurality of rollers, wherein the at least two-sided conveyor grips conveyed batteries from at least two sides.

Batteries may be conveyed on the conveyor using a conveyor unit movable on the plurality of rollers, wherein the conveyor unit may comprise an interface arrangement configured to releasably couple a battery to be conveyed to the conveyor unit. The conveyor arrangement may comprise a winch, wherein the conveyor unit may be moved along the plurality of rollers by means of a rope whose effective length may be controllable by the winch. The interface arrangement may be electronically controllable to open or close a mechanical coupling of the conveyor unit to the battery to be conveyed. Electronic control signals may be delivered to the interface arrangement using a conductor made by at least one of a cable running along the rope, and a rail installed along the conveyor so as to provide a sliding contact to the conveyor unit as the conveyor unit moves along the conveyor. The conductor may be made redundantly by the cable and the rail, wherein a failover mechanism may be provided that switches delivery of the electronic control signals from one of the cable and the rail to the other one of the cable and the rail in case of failure of the one of the cable and the rail.

A detector circuit configured to detect a closed state of the mechanical coupling may be provided. The detector circuit may be provided as part of the interface arrangement, wherein power for the detector circuit may be supplied from the aerial supply vehicle. Also, one part of the detector circuit may be provided in the interface arrangement and another part of the detector circuit may be provided in the battery to be conveyed, wherein the detector circuit may become closed when the mechanical coupling between the conveyor unit and the battery is closed. Also, the detector circuit may be provided as part of the battery to be conveyed, wherein power for the detector circuit may be supplied from the battery.

According to a second aspect, an aerial supply vehicle having a store of replacement batteries suitable to power electric aerial vehicles is provided. The aerial supply vehicle is configured to perform airborne battery replacement using a conveyor arrangement according to the first aspect.

According to a third aspect, an electric aerial vehicle powered by a set of replaceable batteries is provided. The electric aerial vehicle is configured to perform airborne battery replacement using a conveyor arrangement according to the first aspect.

According to a fourth aspect, a system for airborne battery replacement is provided. The system comprises an aerial supply vehicle having a store of replacement batteries suitable to power electric aerial vehicles, an electric aerial vehicle powered by a set of replaceable batteries, and a conveyor arrangement according to the first aspect to convey batteries between the aerial supply vehicle and the electric aerial vehicle during flight to replace a replaceable battery from the set of the electric aerial vehicle by a replacement battery from the store of the aerial supply vehicle.

BRIEF DESCRIPTION OF THE DRAWINGS

Embodiments of the technique presented herein are described herein below with reference to the accompanying drawings, in which:

FIG. 2 schematically illustrates a conveyor comprising a plurality of rollers according to the present disclosure;

FIG. 12 illustrates an exemplary mechanical coupling mechanism provided by an interface arrangement according to the present disclosure;

DETAILED DESCRIPTION

In the following description, for purposes of explanation and not limitation, specific details are set forth in order to provide a thorough understanding of the present disclosure. It will be apparent to one skilled in the art that the present disclosure may be practiced in other embodiments that depart from these specific details.

According to the present disclosure, a conveyor arrangement for airborne battery replacement between an aerial supply vehicle having a store of replacement batteries suitable to power electric aerial vehicles and an electric aerial vehicle powered by a set of replaceable batteries is provided. The conveyor arrangement is configured to convey batteries between the aerial supply vehicle and the electric aerial vehicle during flight to replace a replaceable battery from the set of the electric aerial vehicle by a replacement battery from the store of the aerial supply vehicle.

Figure 1:
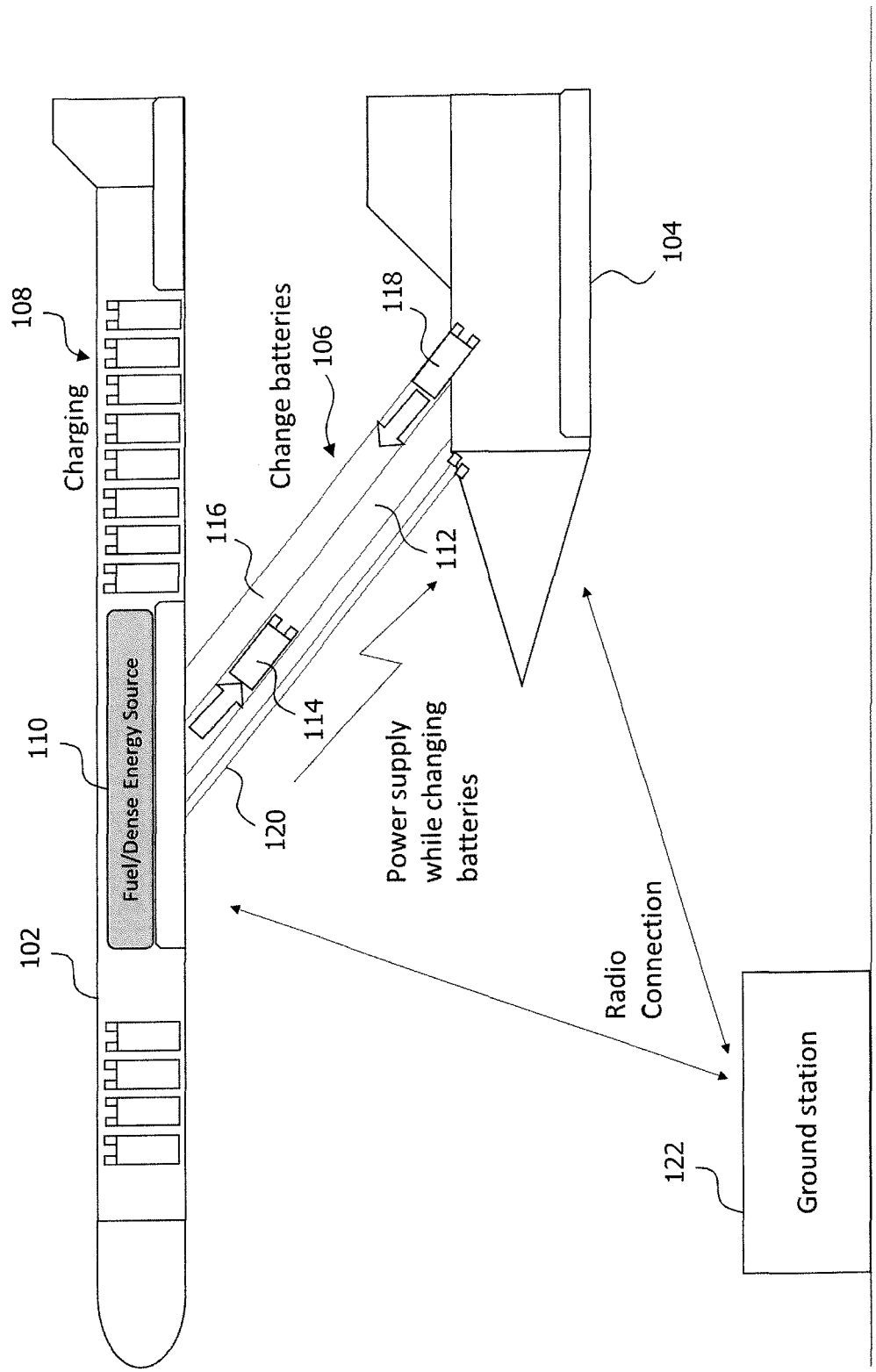
FIG. 1 schematically illustrates a system comprising an aerial supply vehicle, an electric aerial vehicle and a conveyor arrangement according to the present disclosure.

FIG. 1 schematically illustrates a corresponding system comprising an aerial supply vehicle 102, an electric aerial vehicle 104 and a conveyor arrangement 106. As shown in the figure, during flight, the electric aerial vehicle 104 may fly in the same direction and with the same velocity as the aerial supply vehicle 102 in order to keep an approximately steady relative position between the electric aerial vehicle 104 and the aerial supply vehicle 102 which allows attaching the conveyor arrangement 106 therebetween. The conveyor arrangement 106 may be used to provide a physical connection between the aerial supply vehicle 102 and the electric aerial vehicle 104 that may be employed to convey (or "transport") batteries between the electric aerial vehicle 104 and the aerial supply vehicle 102 for replacement purposes. As shown in the figure, the electric aerial vehicle 104 may fly below the aerial supply vehicle so that the conveyor arrangement 106 may extend (e.g., caused by the aerodynamic resistance during flight) in the downward rear direction from the aerial supply vehicle 102 to connect with the electric aerial vehicle 104. The conveyor arrangement 106 may be a separate component from both the aerial supply vehicle 102 and the electric aerial vehicle 104 and may be attachable (e.g., installed as a temporary or permanent component) to one of these vehicles and may be extendable to the other one of these vehicles during flight. In one variant, the conveyor arrangement 106 may be attachable to (e.g., installed as part of) the aerial supply vehicle 102 and may be extendable towards the electric aerial vehicle 104 to dock the electric aerial vehicle 104 to the aerial supply vehicle 102 during flight.

The electric aerial vehicle 104 may be any electrically driven aerial vehicle, i.e., whose aero engines are driven by electrical energy supplied by one or more rechargeable (and replaceable) onboard batteries. The electric aerial vehicle 104 may thus be powered by a set of replaceable batteries, wherein the replaceable batteries may be replaced by replacement batteries provided from the store of the aerial supply vehicle 102 during flight. The electric aerial vehicle 104 may be a UAV, for example, and optionally a drone carrying an RBS. The electric aerial vehicle 104 may thus be a DBS employed to extend (or enhance) radio coverage of a mobile communication system, such as a 5G network, for example.

The aerial supply vehicle 102, on the other hand, may be a large supply aircraft comparable to conventional fuel supply aircrafts. However, rather than having a fuel reservoir to refuel other aircrafts, the aerial supply vehicle 102 may have a store (or "stock") 108 of replacement batteries onboard, from which batteries may be taken to replace discharged batteries of the electric aerial vehicle 104 during flight. The aerial supply vehicle 102 may be a fuel-driven aircraft, for example, which may have a reservoir 110 of fuel or another kind of (e.g., dense) energy source, whose energy may be used to charge the (rechargeable) replacement batteries in the store 108. Discharged batteries received from the electric aerial vehicle 104 via the conveyor arrangement 106 may thus, after completion of the replacement, be placed into the store 108 to be recharged (and, optionally, to be tested on their operability), thereby refurbishing the batteries for use in future airborne battery replacements.

As shown in FIG. 1, the conveyor arrangement 106 may have a path 112 to convey a replacement battery 114 from the store 108 to the electric aerial vehicle 104, where it may be received in a battery bay configured for battery exchange, i.e., in other words, a bay configured to receive replacement batteries from the conveyor arrangement 106 and configured to release (e.g., discharged) batteries from the set of replaceable batteries of the electric aerial vehicle 104 onto the conveyor arrangement 106 for delivery to the aerial supply vehicle 102. The conveyor arrangement 106 may thus also have a path 116 to transport a replaceable battery 118 from the set of rechargeable batteries of the electric aerial vehicle 104 to the aerial supply vehicle 102, where it may be received to be placed into the store 108 for recharging purposes, as described above. While, in FIG. 1, the paths 112 and 116 are exemplarily shown as separate paths allowing a simultaneous (or "parallel") conveyance of replacement and replaceable batteries, it will be understood that a conveyor arrangement having a single path only may be used as well, in which case batteries may be transported between the respective aerial vehicles in subsequent (non-parallel) steps.

The conveyor arrangement 106 may further comprise a power line 120 connectable between the aerial supply vehicle 102 and the electric aerial vehicle 104 during flight to supply the electric aerial vehicle 104 with power from the aerial supply vehicle 102 while performing battery replacement. The power line 120 may be used as a (e.g., backup) power source for the electric aerial vehicle 104 which may supply the electric aerial vehicle 104 with the necessary power to maintain the flight, even though one or more batteries may be removed from the set of replaceable batteries of the electric aerial vehicle 104 (or even though one or more of the batteries become discharged) during the battery replacement. In case the set of replaceable batteries comprises only one battery, the power line 120 may exclusively supply the electric aerial vehicle 104 during battery replacement, for example. The power line 120 may as such provide a security feature that may guarantee continuation of flight even if the battery replacement fails, such as when a battery cannot successfully be replaced or when the replacement battery turns out to work improperly. The power line 120 may also be used to charge at least one of the batteries of the electric aerial vehicle 104, e.g., at least to such an extent that a landing of the electric aerial vehicle 104 is guaranteed. To connect the power line 120 between the aerial supply vehicle 102 and the electric aerial vehicle 104, it will be understood that the power line 120 may have a connector that allows plugging the line 120 into a corresponding socket at the electric aerial vehicle 104. The conveyor arrangement 106 may also comprise a mechanism which automatically plugs the power line 120 into the socket when the conveyor arrangement 106 is docked to the electric aerial vehicle 104.

As shown in FIG. 1, both the aerial supply vehicle 102 and the electric aerial vehicle 104 may support wireless connectivity, such as via a mobile communication network (e.g., a 5G network) or a satellite, allowing them to communicate with each other as well as to communicate with a ground station 122, for example. Such communication may be necessary to coordinate flight paths as well as battery supply and replacement needs among the aerial supply vehicle 102 and the electric aerial vehicle 104, particularly when the electric aerial vehicle 104 is one of a plurality of electric aerial vehicles 104 in need of battery replacement, in which case coordination may be required to appropriately queue the electric aerial vehicles according to their battery replacement priorities, for example.

The conveyor arrangement 106 may be provided in the form of a pipe having outer walls that shield the batteries being conveyed between the aerial supply vehicle 102 and the electric aerial vehicle 104 from aerodynamic forces exerted on the conveyor arrangement 106 during flight. Due to the conveying property in the upward and downward direction, the conveyor arrangement 106 may also be denoted as an "elevator pipe". The conveyor arrangement 106 may comprise a plurality of rollers subsequently arranged to form a flexible conveyor on which batteries can be conveyed (e.g., inside of the outer walls of the pipe). The rollers may be provided in the form of rolling cylinders, for example, on (or "along") which the batteries may be conveyed. The rollers may be provided with a skid-proof surface, for example, enabling the rollers to "grip" the batteries as they are conveyed along the conveyor.

While it will be understood that, for each path provided by the conveyor arrangement 106 (e.g., paths 112 and 116 going in the upward and downward direction), a separate conveyor (each comprising a plurality of subsequently arranged rollers) may be provided, in one particular variant, a single conveyor comprising a plurality of subsequently arranged rollers may be employed, wherein one side of the conveyor may be used to transport batteries in the downward direction and the other side of the conveyor may be used to transport batteries in the upward direction. One side of the conveyor may thus be used to convey batteries from the aerial supply vehicle 102 to the electric aerial vehicle 104 and the opposite side of the conveyor may be used to convey batteries from the electric aerial vehicle 104 to the aerial supply vehicle 102. Such variant is schematically illustrated in FIG. 2, where the replacement battery 114 is conveyed on one side of a conveyor 202 in the downward direction and where the replaceable battery 118 is conveyed on the opposite side of the conveyor 202 in the upward direction, wherein the conveyor 202 is made up by a plurality of rollers 204.

Figure 3B:
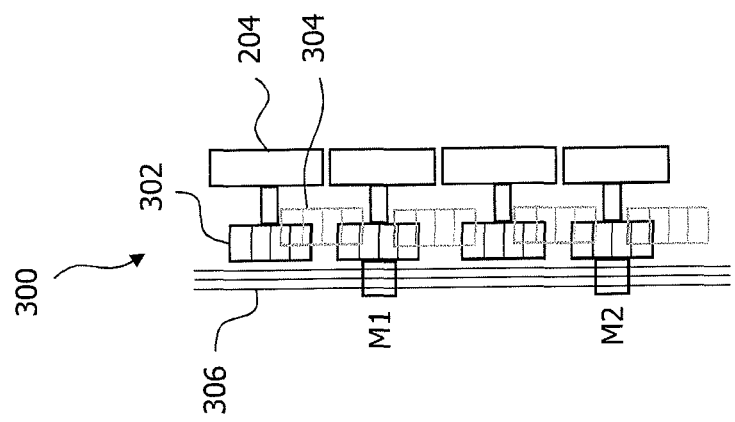
FIGS. 3a and 3b schematically illustrates a gearwheel arrangement from a front view and a top view according to the present disclosure.
Figure 3A:
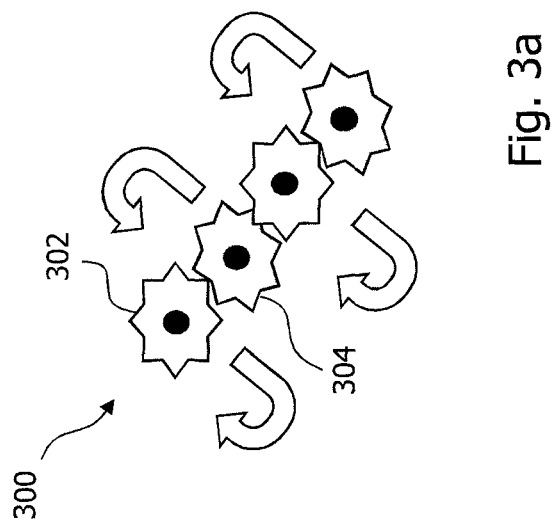

In order to convey batteries along the conveyor, various driving mechanisms may generally be conceivable. In one variant, batteries being conveyed may be driven by an active rotation of at least some of the plurality of rollers along the conveyor, wherein the rollers may grip the batteries (e.g., with their skid-proof surface) to transfer the rotational force of the rollers into a translational movement of the batteries on the rollers and along the conveyor. At least some of the plurality of rollers may be driven using a gearwheel arrangement, for example, which may optionally be driven by a plurality of motors arranged along the conveyor. As exemplarily illustrated in FIGS. 3a and 3b, the rollers 204 may be connected with each odd gearwheel 302 of the gearwheel arrangement 300, for example, wherein even gearwheels 304 may be arranged between each pair of odd gearwheels 302 in order to translate the rotational movement of one odd gearwheel 302 to the next odd gearwheel 302. As indicated in FIG. 3a, which shows a front view of the gearwheel arrangement 300, even gearwheels 304 may in this case rotate in the opposite direction of the odd gearwheels 302, wherein odd gearwheels 302 may rotate in the same direction.

While it will be understood that a single motor (e.g., a stepper motor) driving one of the plurality of gearwheels may be sufficient to drive the gearwheels along the gearwheel arrangement, in one variant, the plurality of rollers may be driven by a plurality of motors arranged along the conveyor, e.g., in order to (e.g., equally) distribute driving forces along the length of the conveyor. Motors may be provided to drive every second, third, fourth, etc. gearwheel of the gearwheel arrangement, for example, in order to (e.g., equally) share the driving load required to drive the gearwheel arrangement along the length of the conveyor. FIG. 3b, which shows a top view of the gearwheel arrangement 300, illustrates an example in which motors M1 and M2 are provided at every second odd gearwheel 302 of the gearwheel arrangement 300. At least some gearwheels of the gearwheel arrangement may be driven by force stimulated motors (e.g., 360 degrees servos) which may be activated depending on a load applied on the conveyor, e.g., in particular a load applied on a portion of the conveyor at which the respective force stimulated motor resides. In this way, the motors may be activated only when batteries are actually on the conveyor and in need for conveyance between the aerial vehicles 102 and 104.

Figure 4:
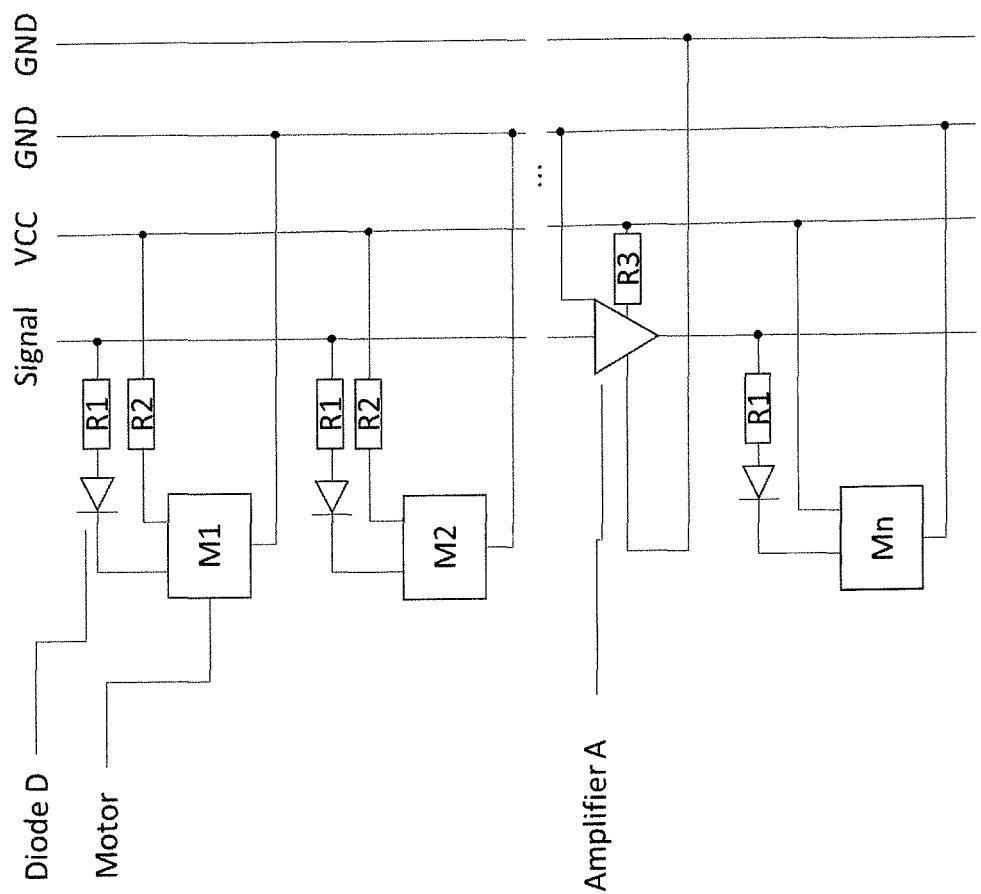
FIG. 4 illustrates the wiring of a plurality of motors driving a gearwheel arrangement according to the present disclosure.

As shown in FIG. 3b, the plurality of motors may be supplied with power and control signals via respective cables 306 that may be run along the conveyor. In one variant, each motor may be provided with separate cables and, in another variant, the plurality of motors may be provided with common cables, as shown in the example of FIG. 3b. As exemplarily illustrated in FIG. 4, the cables may be installed to provide control signals (e.g., pulse width modulation (PWM) or pulse position modulation (PPM)), voltage common collectors (VCCs) and ground (GND). As shown, the voltage of each motor input signal may be scaled by a resistor R1, the voltage of each motor VCC may be scaled by a resistor R2, and a diode D may be used to prevent changes of the magistral signal shape in case of feedback from the motor. Over longer distances, the signal voltage may decrease due to the resistance of the cable and, therefore, the signal voltage may need to be amplified by an amplifier A after a certain distance. The conveyor arrangement 106 may thus comprise at least one amplifier power circuit to amplify electric control signals delivered to motors that are distant over a threshold distance. In such situations, another GND cable may be needed for the amplifier power circuit and a resistor R3 in order to scale the amount of source voltage the amplifier A should receive to amplify the signal appropriately. It will be understood that, in case of several amplifications over a longer distance, the control signal may lose its rectangular shape and, therefore, in some variants, it may also be conceivable to provide separate cables for each distance segment among the motors.

Figure 5A:
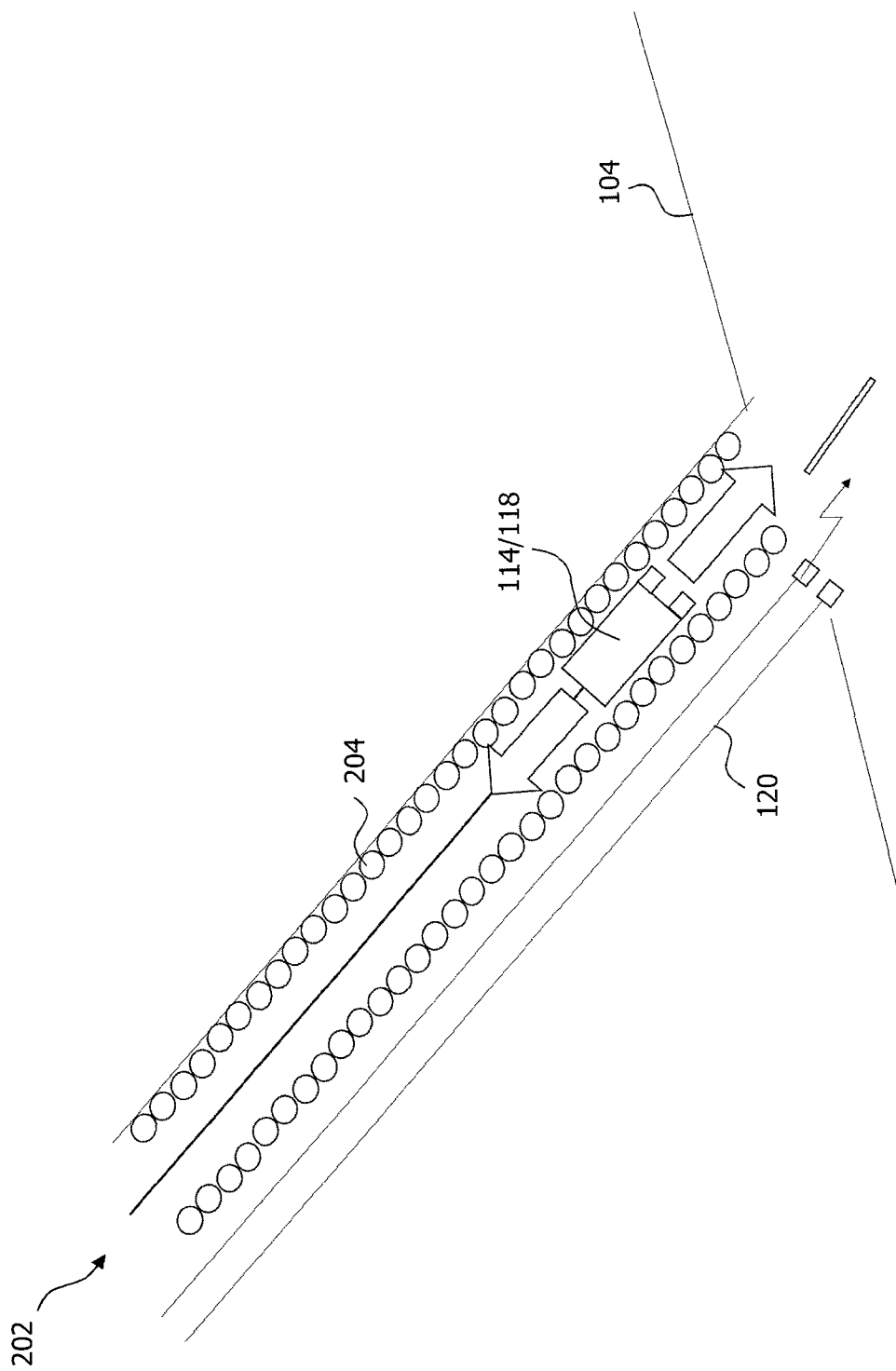
FIGS. 5a and 5b schematically illustrate variants of two-sided conveyors according to the present disclosure.
Figure 5B:
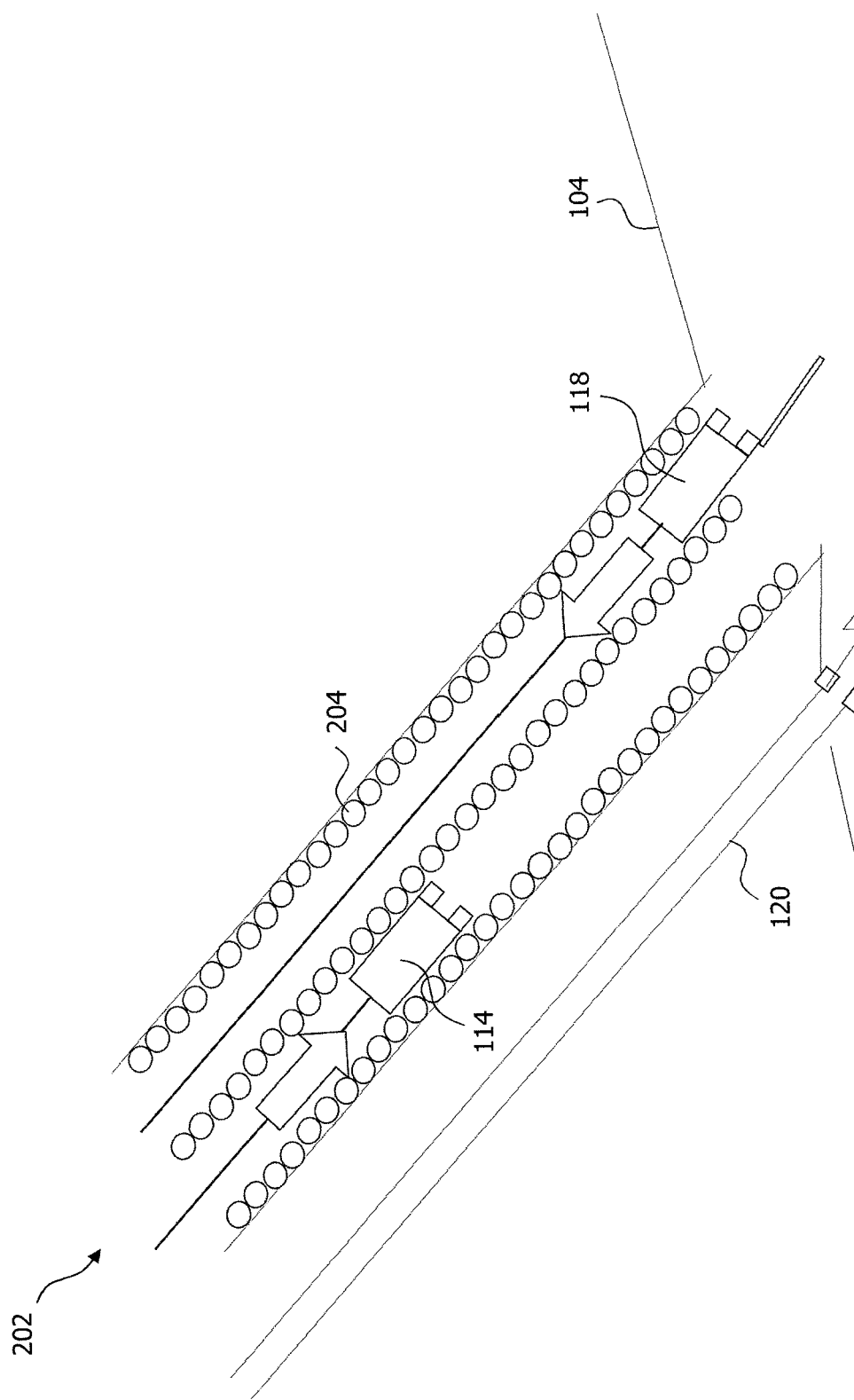

As said, various driving mechanisms to convey batteries on the conveyor may generally be conceivable, including variants in which the rollers grip the batteries to transfer the rotational force of the rollers into a translational movement of the batteries on the conveyor. In a refinement of such variants, additional sequences of rollers may be provided to grip batteries from multiple sides while the batteries are conveyed between the aerial vehicles 102 and 104. The conveyor arrangement 106 may thus comprise an additional plurality of rollers subsequently arranged to form an at least two-sided conveyor with the plurality of rollers, wherein the at least two-sided conveyor grips conveyed batteries from at least two sides. FIG. 5a illustrates an exemplary variant, in which the battery to be conveyed (e.g., the replacement battery 114 or the replaced battery 118) is gripped from two sides of a two-sided conveyor 202 having sequences of rollers 204 on both sides of the battery to be conveyed. FIG. 5b illustrates another such variant, in which two separate paths (like paths 112 and 116 of FIG. 1) are provided, each being formed of a two-sided conveyor 202 having sequences of rollers 204 on both sides of the respective battery to be conveyed, wherein one side of the middle sequence of rollers 204 is used to convey batteries in the downward direction and the other (opposite) side of the middle sequence of rollers 204 is used to convey batteries in the upward direction, as described above. The additional plurality of rollers may have the same characteristics as the plurality of rollers described above. As such, the additional plurality of rollers may likewise be driven using a gearwheel arrangement in one of the variants described above, for example.

Figure 6:
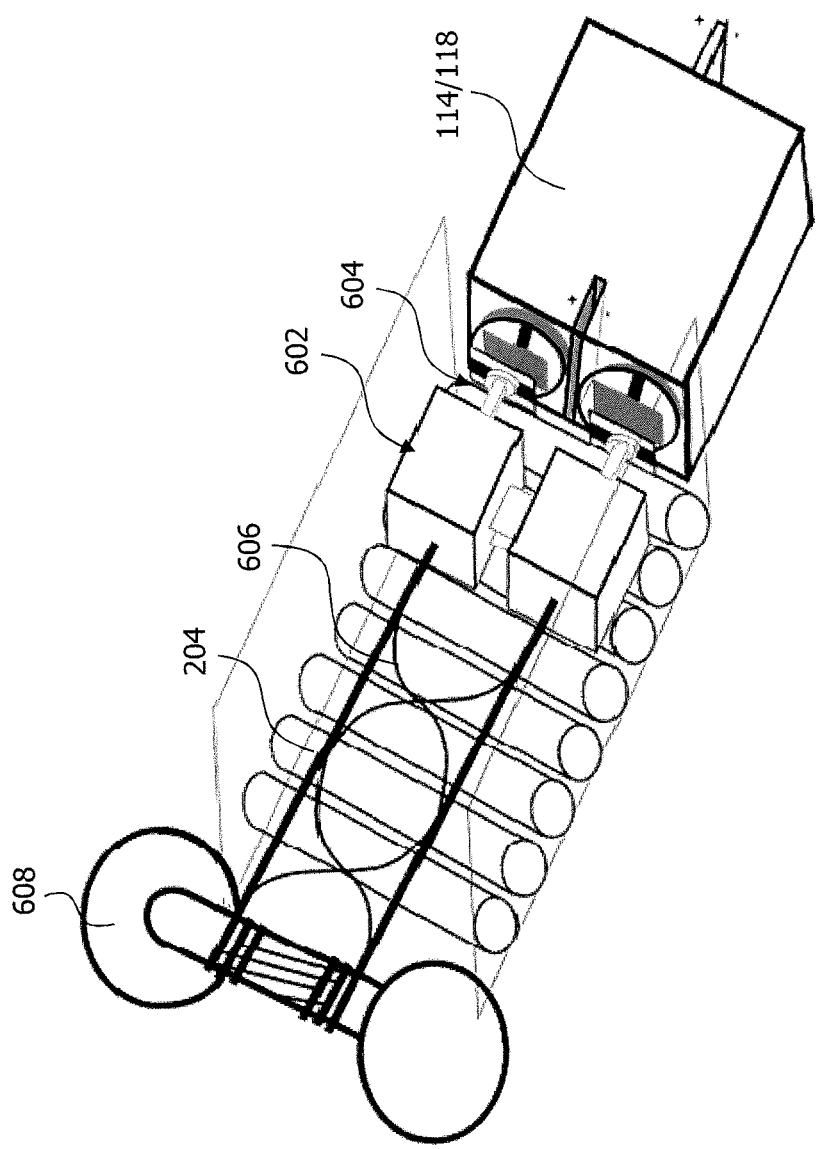
FIG. 6 illustrates a perspective view of a conveyor on which a conveyor unit is driven by a winch according to the present disclosure.

In some implementations, batteries may be conveyed on the conveyor by the assistance of an auxiliary component, which will be denoted as "conveyor unit" herein below. Batteries may thus be conveyed on the conveyor using a conveyor unit movable on the plurality of rollers, wherein the conveyor unit may comprise an interface arrangement configured to releasably couple a battery to be conveyed to the conveyor unit. In such cases, another driving mechanism for conveying batteries along the conveyor may involve the use of a rope attached to the conveyor unit, wherein the length of the rope may be used to control the position of the conveyor unit on the conveyor. The length of the rope may be controlled using a winch which may be provided at an upper end of the conveyor arrangement 106, such as in the aerial supply vehicle 102, for example. The conveyor arrangement 106 may as such comprise a winch, wherein the conveyor unit (and the battery coupled thereto) may be moved along the plurality of rollers by means of a rope whose effective length (corresponding to the unwound length of the rope) may be controllable by the winch. FIG. 6 illustrates a perspective view of an exemplary embodiment in which the battery to be conveyed (e.g., the replacement battery 114 or the replaced battery 118) is releasably coupled to a conveyor unit 602, wherein the coupling is achieved by means of an interface arrangement 604 of the conveyor unit 602. In the shown example, the conveyor unit 602 comprises two sub-units, each of which is attached to a rope 606 whose effective length may be controlled by a winch 608.

Figure 7:
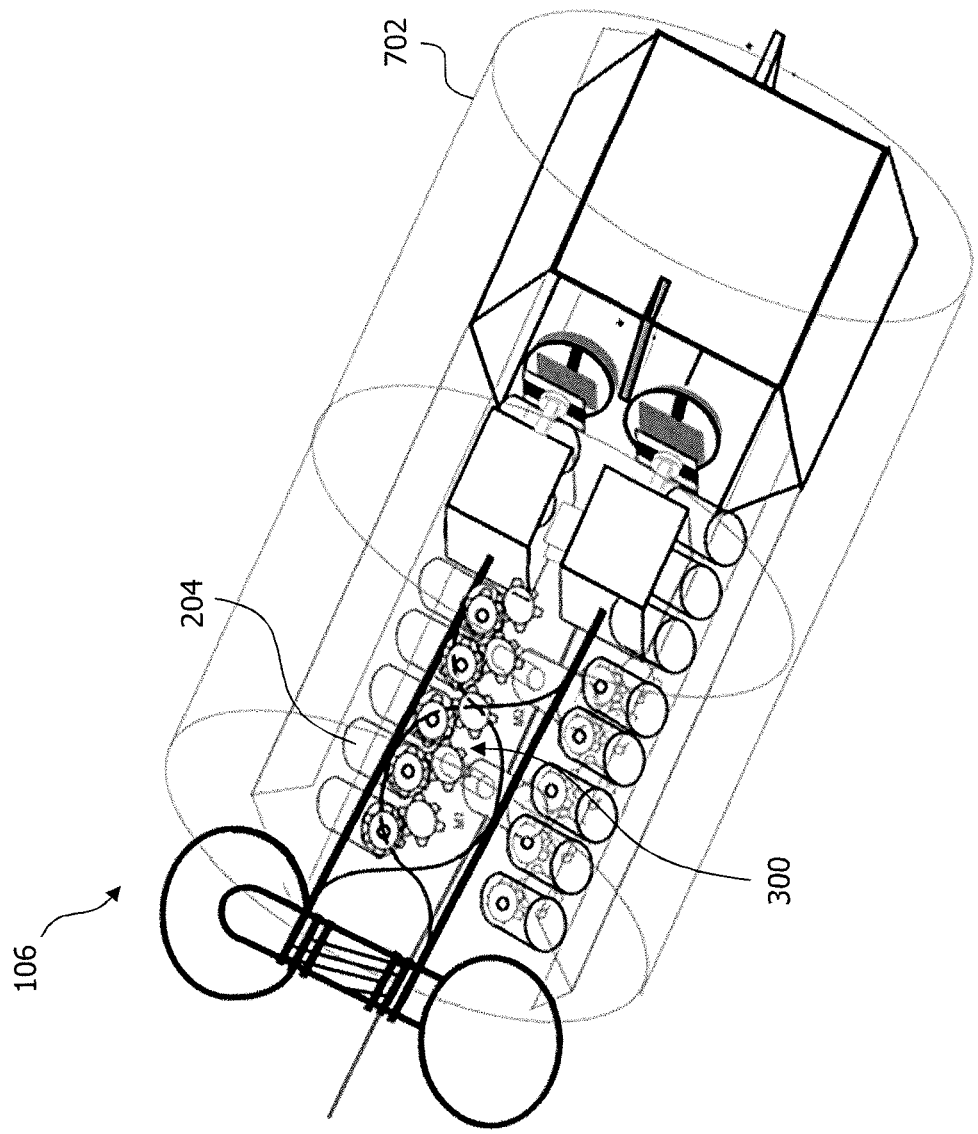
FIG. 7 illustrates a variant of FIG. 6 in which rollers of the conveyor are additionally propelled by a gearwheel arrangement.

Such winch-based driving mechanism may be provided in addition, or in the alternative, to the above-described gearwheel arrangement-based driving mechanism. In the example of FIG. 6, the winch-based mechanism is provided as the sole driving mechanism (i.e., without gearwheel arrangement-based driving) and, therefore, the rollers 204 correspond to loose (i.e., freely-rotatable) rollers which may rotate as the conveyor unit 602 (and the battery coupled thereto) are moved on the conveyor, thereby allowing a sliding movement of the conveyor unit 602 over the rollers 204. It will be understood that, in other embodiments, the winch-based driving mechanism may be supported by a gearwheel arrangement-based driving mechanism. Such variant is exemplarily shown in FIG. 7 which basically equals the example of FIG. 6, the only difference being that the rollers 204 are additionally propelled by a gearwheel arrangement 300. FIG. 7 further shows that multiple parallel rows (in the shown example: two parallel rows) of geared rollers 204 may be provided to form the conveyor. FIG. 7 moreover hightlights that the conveyor arrangement 106 may be provided in the form of a pipe shielding the conveyed batteries from aerodynamic forces during flight. The outer walls of the pipe are indicated in the figure by reference numeral 702. It will be understood that, in other variants, the combination of the gearwheel arrangement 300 and the rollers 204 may differ. For example, the rollers, instead of rolling cylinders, may be given by the gearwheels themselves, the teeth of which may then grip the conveyor unit 602 and/or the batteries being conveyed.

As said, the ropes attached to the conveyor unit may be wound and unwound by a winch provided at the aerial supply vehicle 102. The ropes may be steel, glass fiber or carbon fiber ropes (or a composite thereof), for example. As said, the conveyor unit may comprise an interface arrangement configured to releasably couple the battery to be conveyed to the conveyor unit. The releasable coupling between the conveyor unit and the battery may correspond to a mechanical coupling, which may be electronically controlled to open or close by a control unit (e.g., provided at the aerial supply vehicle 102). The interface arrangement may thus be electronically controllable to open or close a mechanical coupling of the conveyor unit to the battery to be conveyed. In order to deliver corresponding electronic control signals to the interface arrangement, various implementations may generally be conceivable. While it will be understood, that wireless communication technology may be used to communicate corresponding control signals, in another variant, electronic control signals may be delivered (e.g., from the control unit) to the interface arrangement using a conductor made by at least one of a cable running along the rope, and a rail installed along the conveyor so as to provide a sliding contact to the conveyor unit as the conveyor unit moves along the conveyor.

Figure 8:
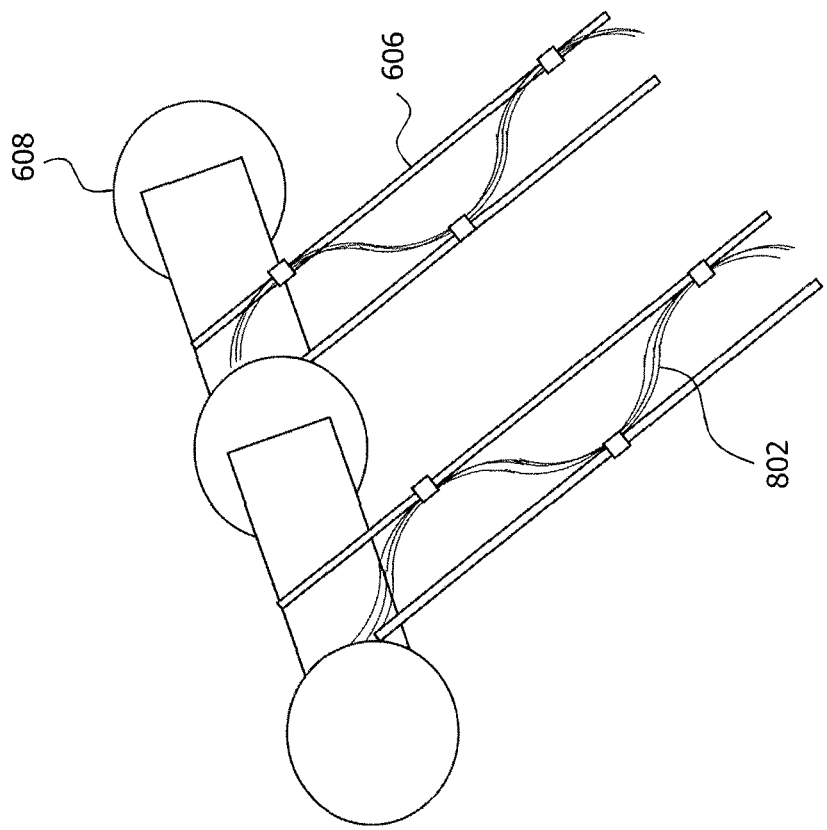
FIG. 8 illustrates how conductor cables may be run along the ropes of a winch.

FIG. 8 exemplarily illustrates a winch 608 including ropes 606 attached to a conveyor unit, as described above. As one possible conductor realization for the delivery of electronic control signals to the interface arrangement, FIG. 8 additionally shows cables 802 that are run along the ropes 606. More specifically, as shown in the figure, the cables 802 may be run between two parallel ropes 606 in a meandering manner so that the (effective) cable length may be longer than the (effective) length of the ropes to provide a buffer for rope flexibility. In one variant, the cables 802 may be twice as long as the ropes 606, for example.

Figure 9:
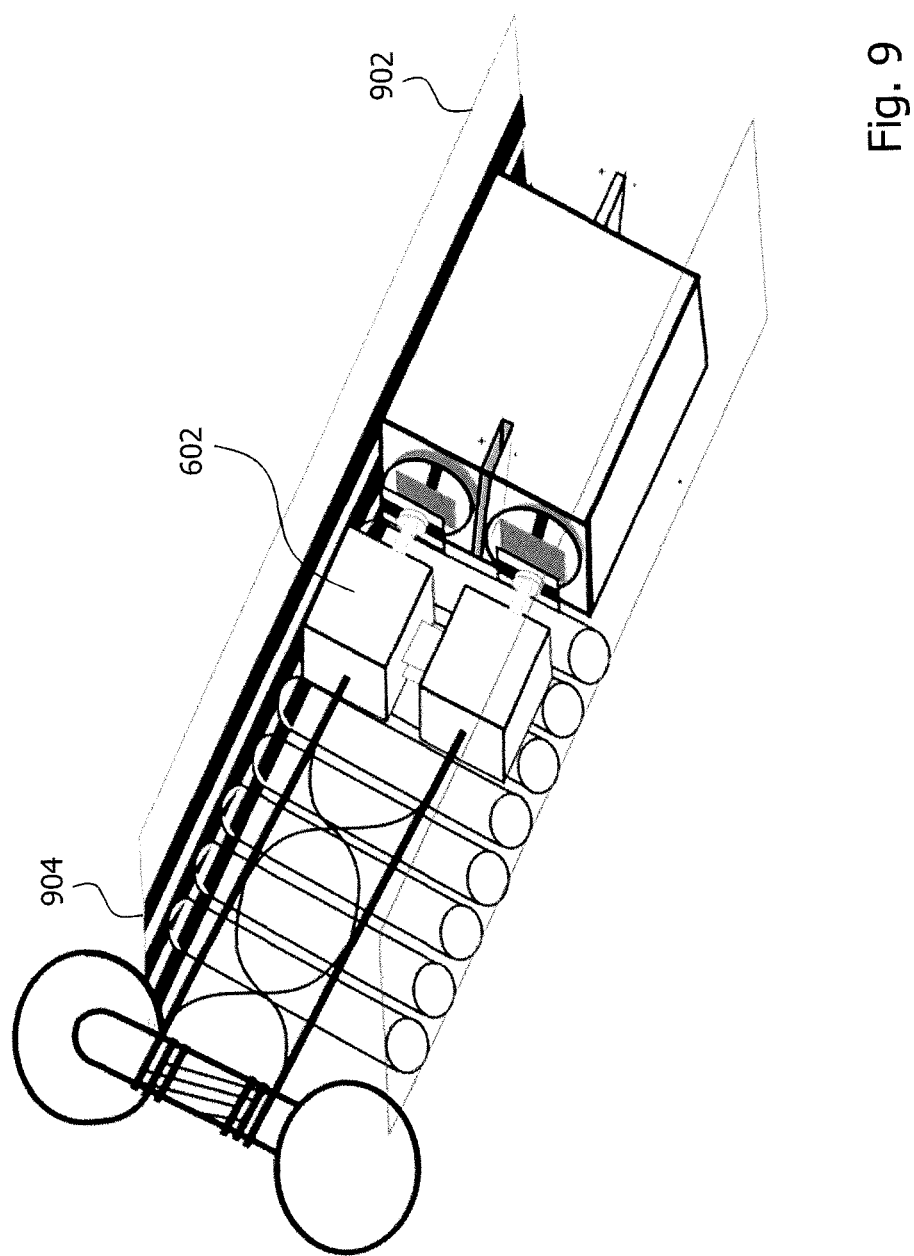
FIG. 9 illustrates a variant of FIG. 6 in which a conductor rail providing sliding contacts for the conveyor unit is arranged along the conveyor.
Figure 13:
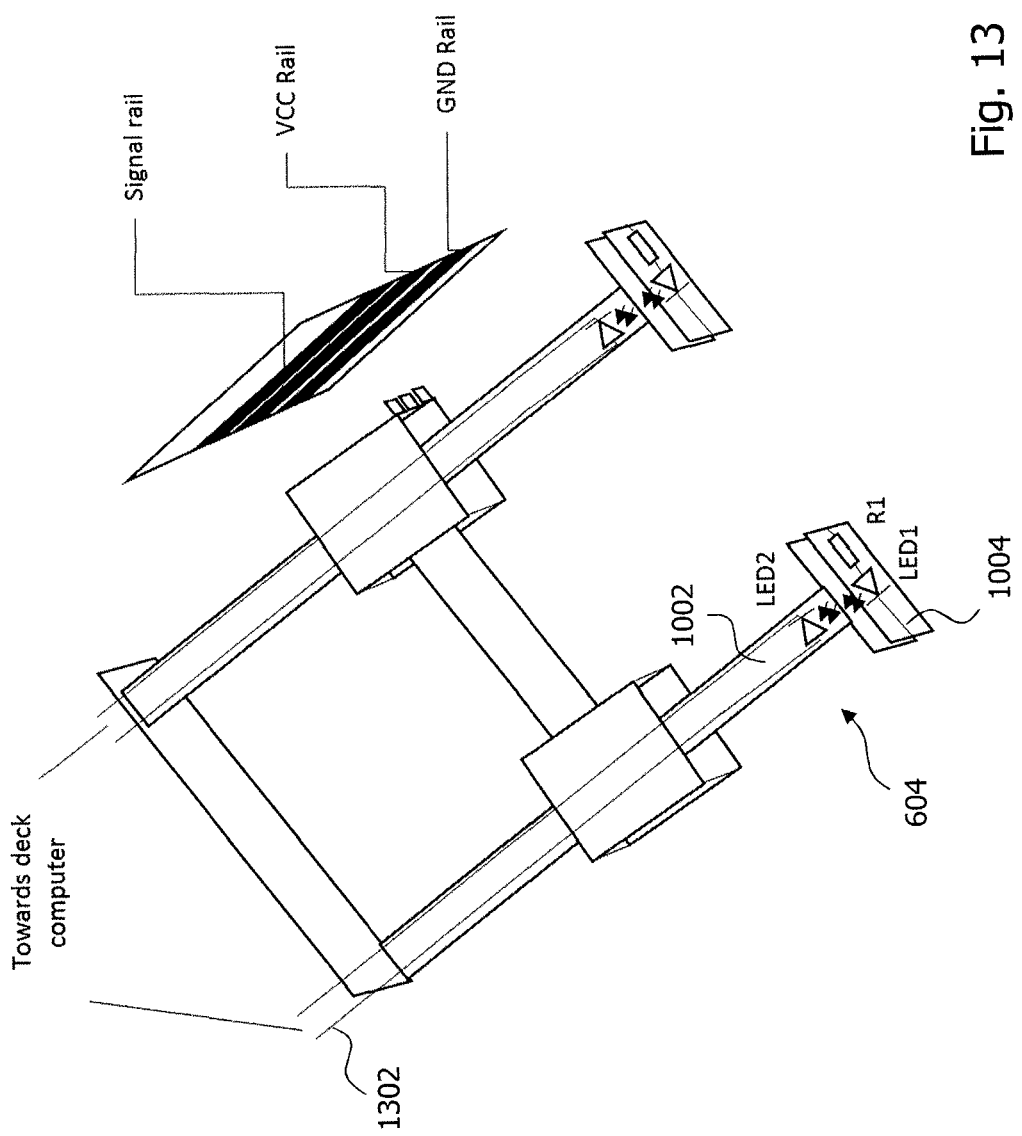
FIG. 13 illustrates an exemplary embodiment in which a detector circuit is provided as part of an interface arrangement.

As another possible conductor realization for the delivery of electronic control signals to the interface arrangement, FIG. 9 shows a rail 902 installed along the conveyor in addition to the example of FIG. 6, wherein the rail 902 provides sliding contacts 904 (in the shown example, three sliding contacts, e.g., for signal, VCC and GND; cf. also FIG. 13) to keep electrical connectivity as the conveyor unit 602 moves along the conveyor. In some variants, the conductor may be made redundantly by the cable and the rail, wherein a failover mechanism may be provided that switches delivery of the electronic control signals from one of the cable and the rail to the other one of the cable and the rail in case of failure of the one of the cable and the rail. In other words, twin signals may be provided from the control unit to the interface arrangement so that, in case of a failure of one of the conductor realizations, the other realization may maintain the needed electrical connectivity. For example, when the main signal is delivered by the cable, signal and power delivery may be switched to the rail in case of cable failure to thereby deliver the signal and power to the interface arrangement via the rail instead of via the cable.

Figure 10:
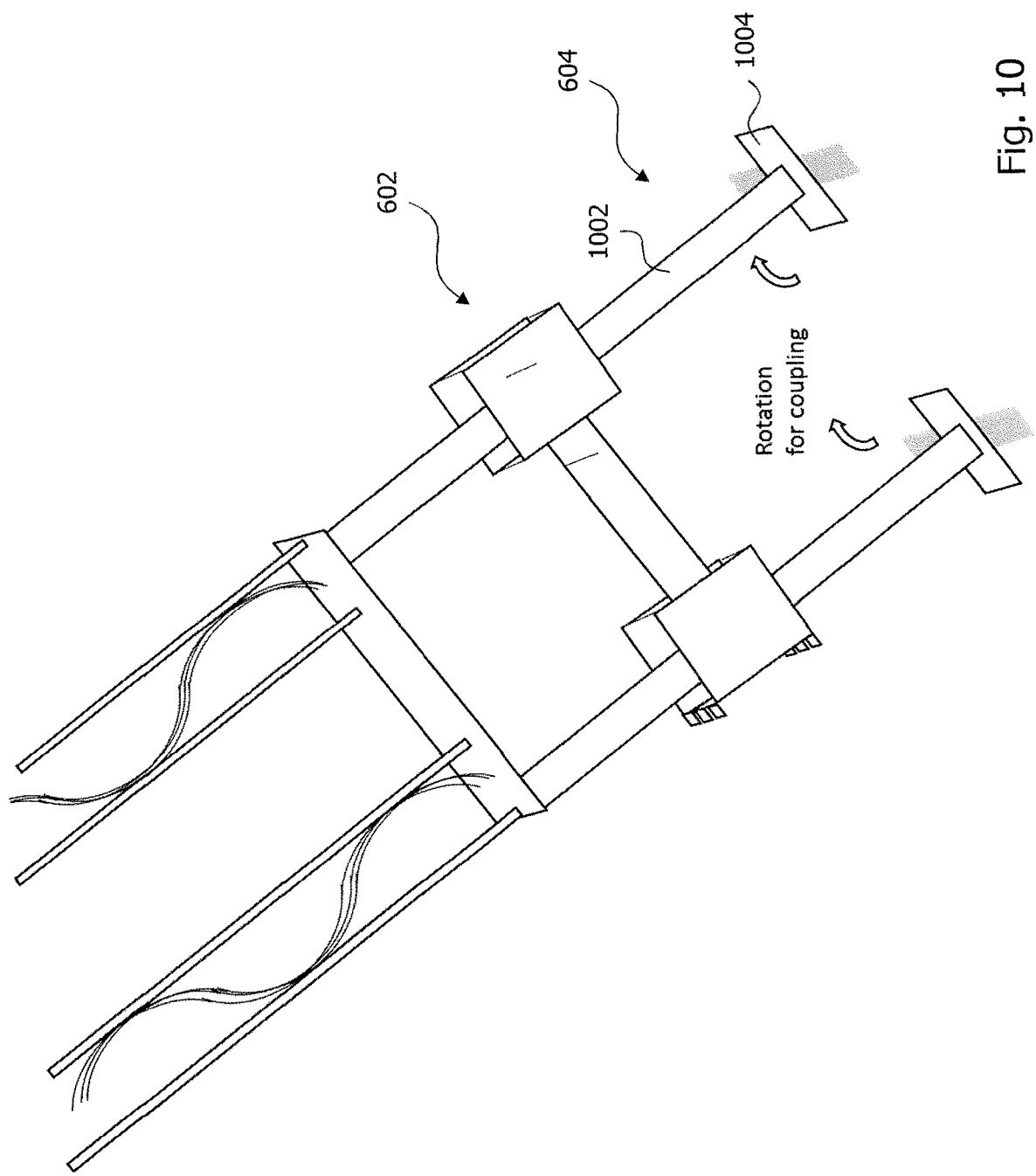
FIG. 10 illustrates an exemplary interface arrangement according to the present disclosure.

FIG. 10 illustrates an exemplary realization of an interface arrangement 604 which may be used to releasably couple the conveyor unit 602 to a battery to be conveyed.

Figure 11:
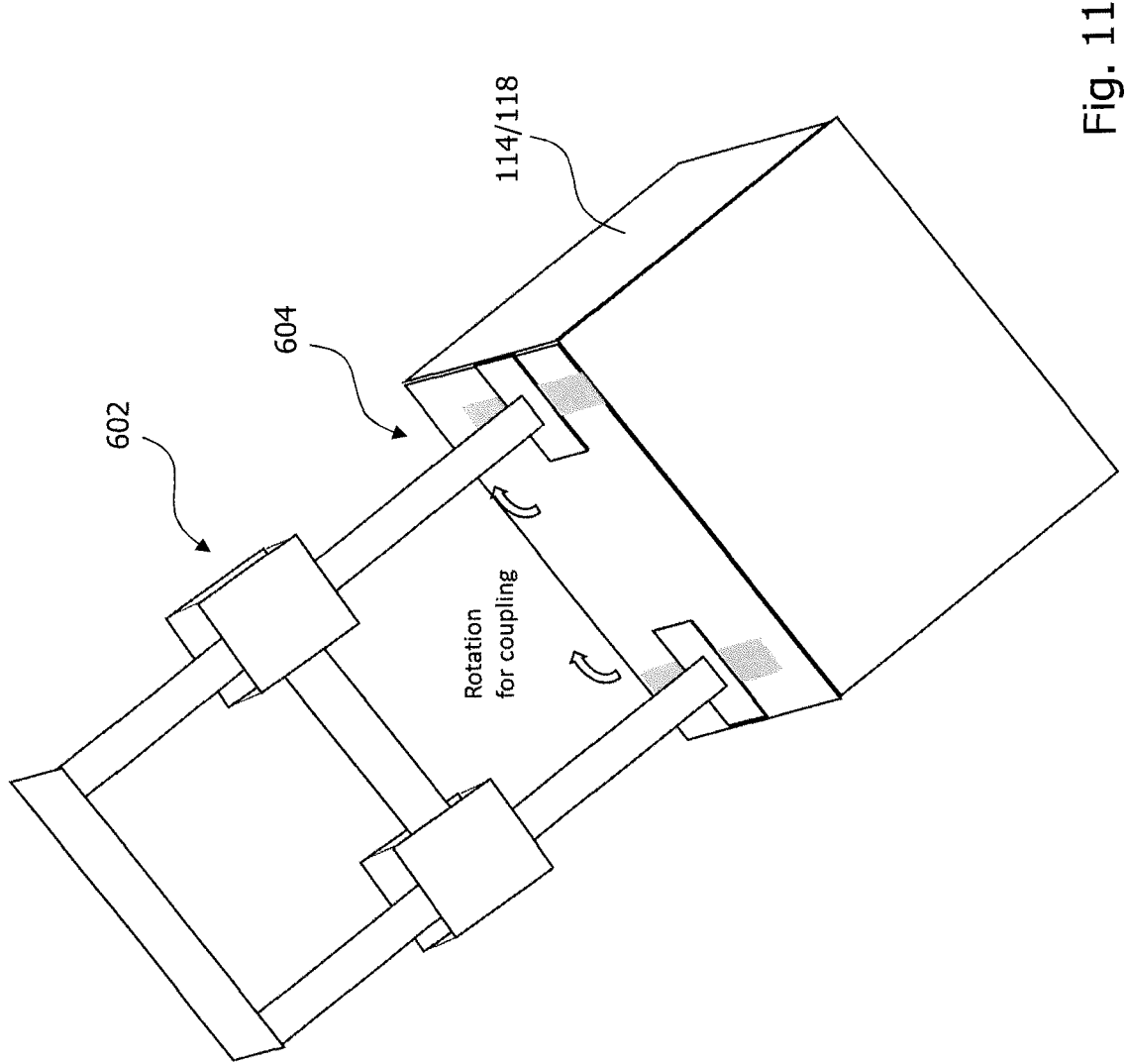
FIG. 11 illustrates an interface arrangement releasably coupled to a battery according to the present disclosure.

As shown, the interface arrangement 604 may comprise arms 1002 extending from the conveyor unit 602 towards the battery to be conveyed, wherein rotatable handlers 1004 may be used to establish a mechanical coupling with the battery to be conveyed. FIG. 11 shows such coupling together with a corresponding battery (e.g., the replacement battery 114 or the replaced battery 118) and FIG. 12 illustrates in more detail how the mechanical coupling may be established. As shown, to bring the mechanical coupling between the handler 1004 and the battery into a closed state, the rotatable handlers 1004 may be inserted into corresponding openings provided at the battery and may then be rotated to establish a positive form locking (or "form fit") with the battery. It will be understood that such mechanical coupling is merely exemplary and that various other realizations of a coupling are generally conceivable.

As said, the interface arrangement may be electronically controllable (e.g., via the conductor) to open or close the mechanical coupling between the conveyor unit and the battery to be conveyed. In order to monitor the state of the mechanical coupling, a detector circuit configured to detect a closed state of the mechanical coupling may be provided. It will be understood that such detector circuit may be realized in various ways. In one variant, the detector circuit may be provided as part of the interface arrangement, wherein power for the detector circuit may be supplied from the aerial supply vehicle 102. FIG. 13 illustrates an exemplary embodiment of such variant. As can be seen, the rotatable handlers 1004 of the interface arrangement 604 may be provided with electric detection circuits which are closed when the mechanical coupling between the handlers 1004 and the battery is closed, as described above. In the battery, only a simple conductor may be provided which closes the electric detection circuits of the handlers 1004 when the mechanical coupling is in the closed state. In the shown example, LEDs (LED1) included in the handlers 1004 may start emitting light to photodiodes LED2 included in the arms 1002 when the circuit gets closed (when the mechanical coupling is established) and thus output a signal via lines 1302 to the control unit in the aerial supply vehicle 102, thereby indicating to the control unit that the mechanical coupling has properly brought into the closed state. Power for the electric detection circuit may in this variant be supplied from the aerial supply vehicle 102 via lines 1302, for example.

Figure 14:
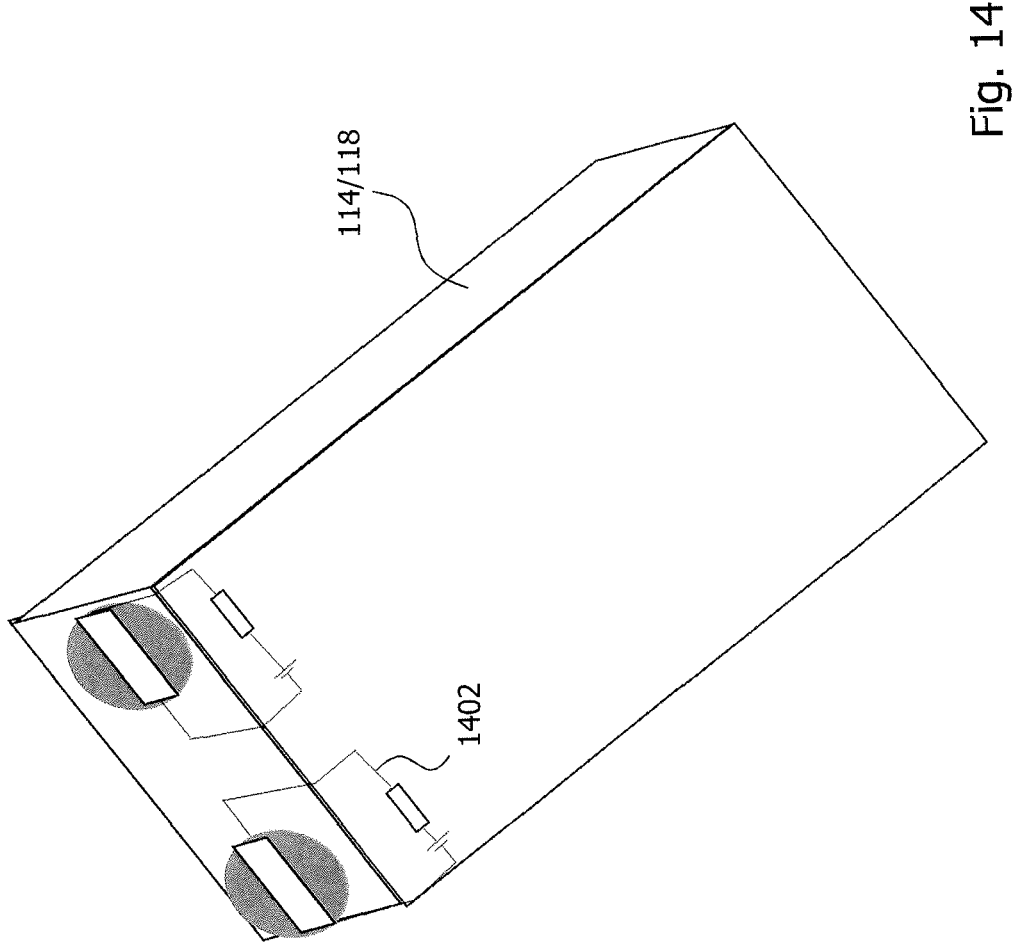
FIG. 14 illustrates an exemplary embodiment in which part of a detector circuit is provided in the battery.

In another variant of realizing the detector circuit, one part of the detector circuit may be provided in the interface arrangement and another part of the detector circuit may be provided in the battery to be conveyed, wherein the detector circuit may become closed when the mechanical coupling between the conveyor unit and the battery is closed. FIG. 14 illustrates an exemplary embodiment of such variant on the side of the battery to be conveyed. As can be seen, the battery may comprise an electric circuit 1402 that forms part of the detector circuit so that the detector circuit may output a signal to the control unit when an electrical connection is established between the part of the circuit in the interface arrangement and the part of the circuit in the battery. In this variant, power for the detector circuit may be supplied either from the aerial supply vehicle or from the battery. In case power is supplied from the battery, a (separate) sub-battery may be provided within the housing of the battery to be conveyed, wherein the sub-battery may be chargeable from the main battery, for example.

Figure 15:
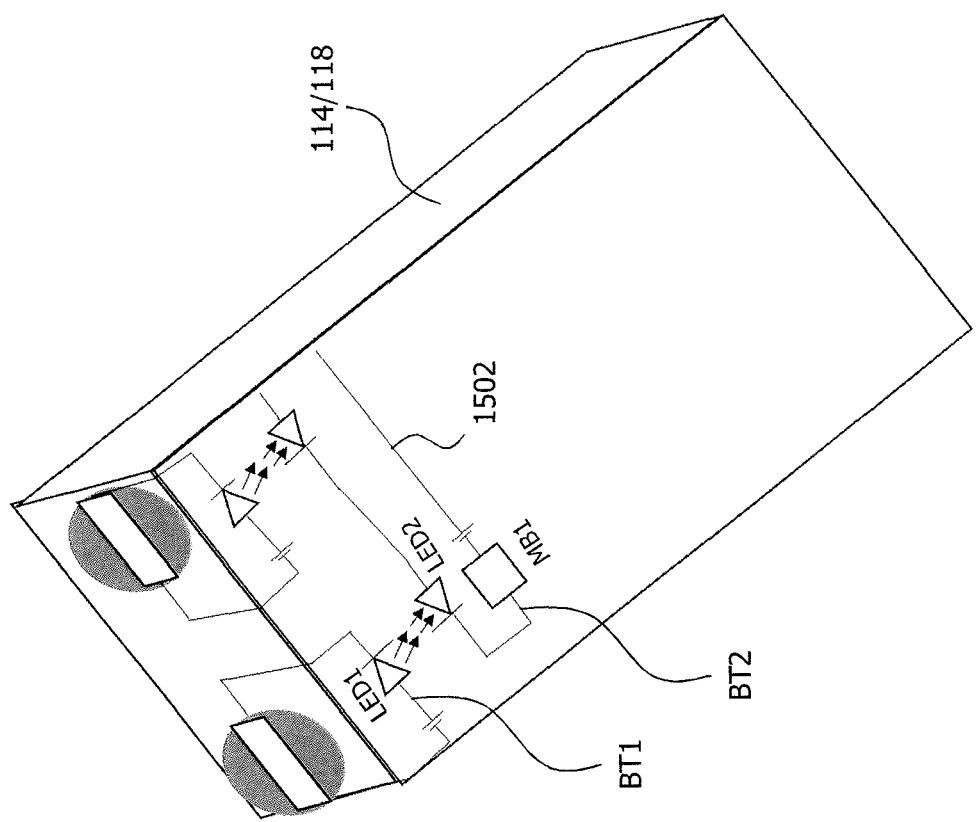
FIG. 15 illustrates an exemplary embodiment in which a detector circuit is provided as part of a battery.

In still another variant of realizing the detector circuit, the detector circuit may be provided as part of the battery to be conveyed, wherein power for the detector circuit may be supplied from the battery. In this variant, the detector circuit may be provided at the side of the battery only and, in the handlers 1004 of the interface arrangement, only a simple conductor may be provided which closes the detector circuit of the battery when the mechanical coupling is in the closed state. FIG. 15 illustrates an exemplary embodiment of such variant. As can be seen, the battery may be provided with electric detection circuits which are closed when the mechanical coupling between the handlers 1004 and the battery is closed, as described above. In the shown example, circuits BT1 and BT2 are provided, wherein circuit BT1 may start to work when the electric detection circuits become closed by the simple conductor of the handlers 1004 when the mechanical coupling is brought into a closed state. In response, an LED1 light is turned on and a photodiode LED2 receiving the light enables conductance in circuit BT2. A beacon or modem MB1 may receive the corresponding signal, indicating that the battery is safely coupled to the interface arrangement. The beacon or modem MB1 may then wirelessly communicate a message to the control unit in the aerial supply vehicle 102, indicating that the mechanical coupling is properly established. The detector circuit's power source may in this case be a sub-battery provided in the housing of the battery to be conveyed, wherein the sub-battery may be chargeable from the main battery, for example.

Figure 16A:
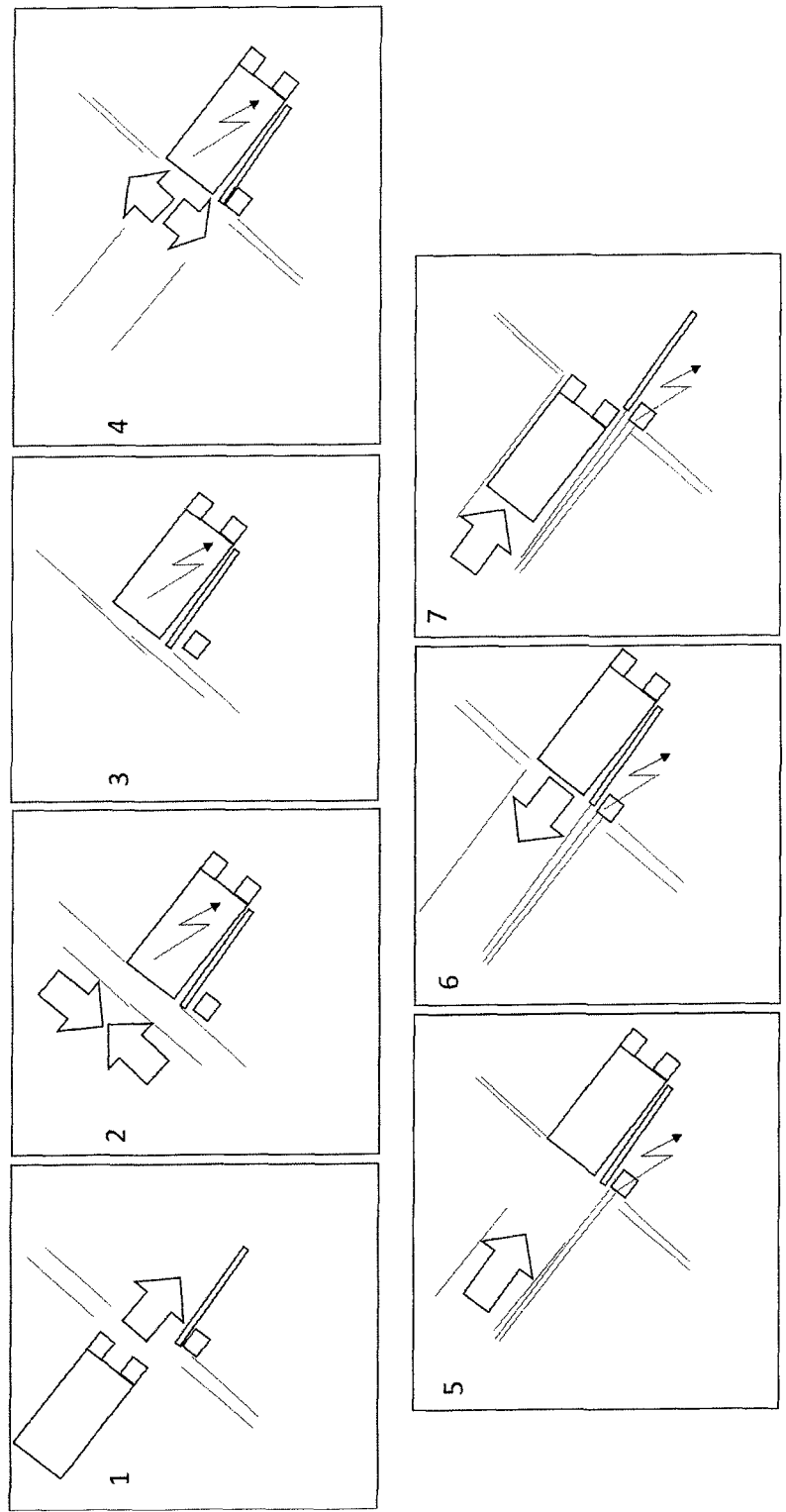
FIGS. 16a and 16b illustrate an exemplary method comprising a sequence of steps using a conveyor arrangement having a single path for battery replacement according to the present disclosure.
Figure 16B:
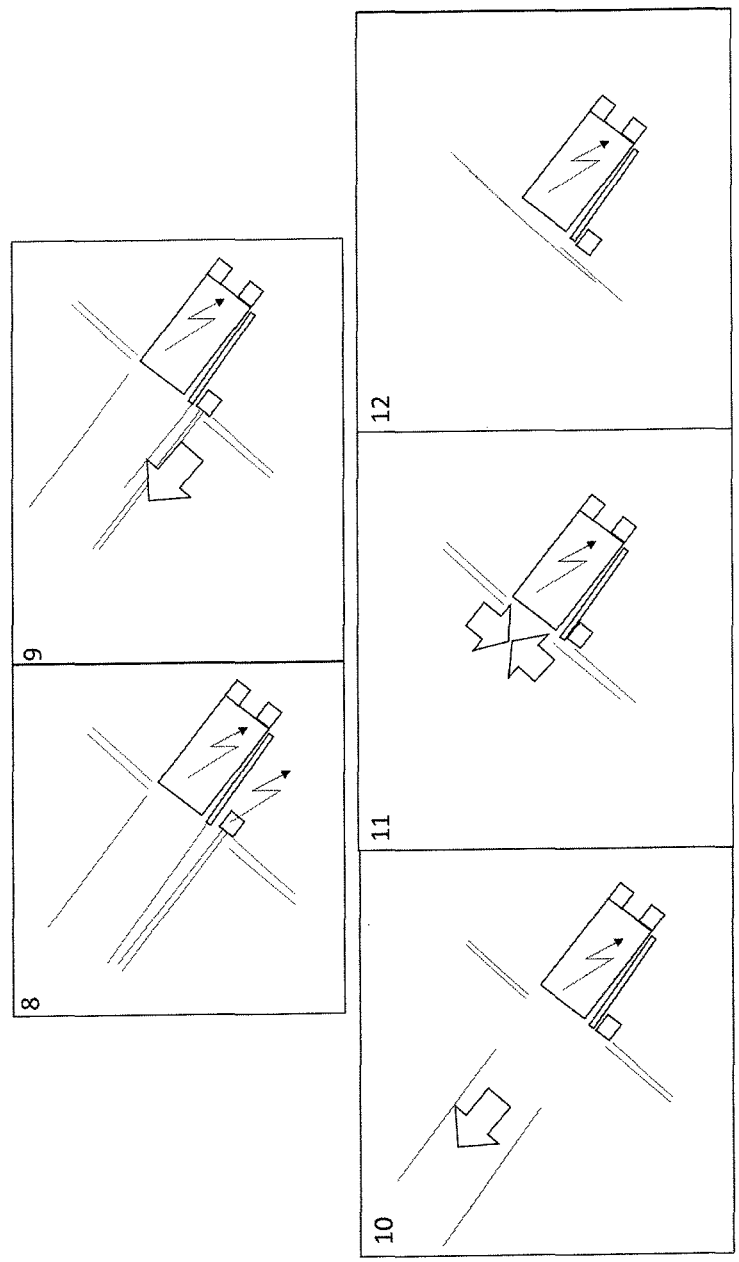

FIGS. 16a and 16b illustrate an exemplary method including a sequence of steps from the viewpoint of the electric aerial vehicle 104 which may be carried out with respect to a battery of the electric aerial vehicle 104, wherein battery replacement is performed using a conveyor arrangement 106 having a single path for battery replacement. In step 1, when the electric aerial vehicle 104 is still on ground, a fresh battery may be inserted into the battery bay of the electric aerial vehicle 104. In step 2, the battery bay may be closed and, in step 3, the electric aerial vehicle 104 may take off and perform its dedicated airborne operations. In step 4, when the battery of the electric aerial vehicle 104 is to be replaced by a replacement battery from the aerial supply vehicle 102 (e.g., due to the battery becoming discharged), the battery bay of the electric aerial vehicle 104 may be opened during flight to enable docking the conveyor arrangement 106 (the "pipe") to the electric aerial vehicle 104. In step 5, the conveyor arrangement 106 may be docked to the electric aerial vehicle 104, wherein the power line from the aerial supply vehicle 102 may be connected to the electric aerial vehicle 104 to provide an external power source for the electric aerial vehicle 104 during the battery replacement. In step 6, the battery to be replaced may be unmounted and pulled out of the battery bay to be conveyed via the conveyor arrangement 106 to the aerial supply vehicle 102. In step 7, a fresh battery may then be pushed from the aerial supply vehicle 102 via the conveyor arrangement 106 to the electric aerial vehicle 104 and may be mounted in its battery bay. In step 8, the newly inserted battery may be connected as new power source in the electric aerial vehicle 104. In step 9, the external power source may be disconnected when it is determined that the mechanical coupling between the conveyor unit and the battery is released. In step 10, the electric aerial vehicle 104 may undock from the conveyor arrangement 106 and, in step 11, the battery bay of the electric aerial vehicle 104 may be closed accordingly. Finally, in step 12, the electric aerial vehicle may be fully operable again, having a fresh battery as its new power source.

Figure 17A:
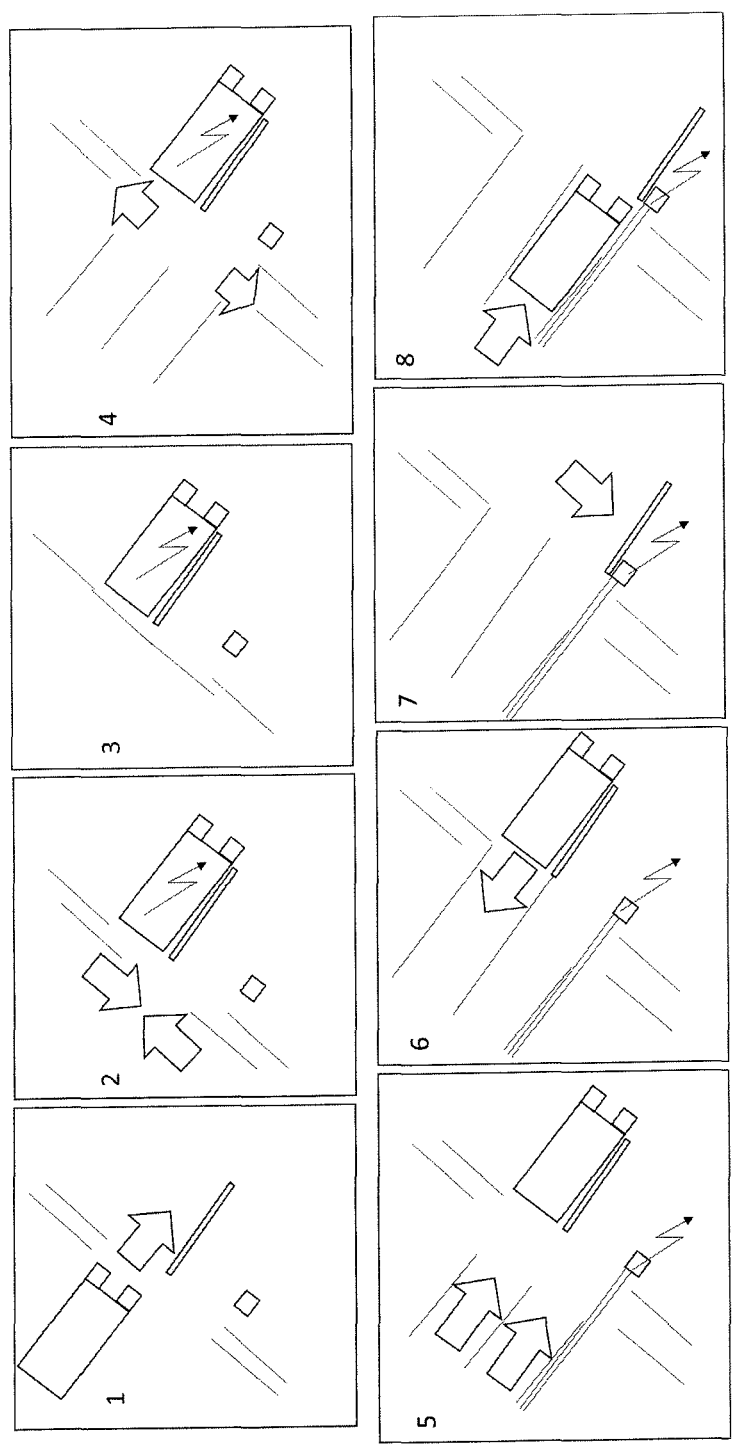
FIGS. 17a and 17b illustrate an exemplary method including a sequence of steps using a conveyor arrangement having multiple paths for battery replacement according to the present disclosure.
Figure 17B:
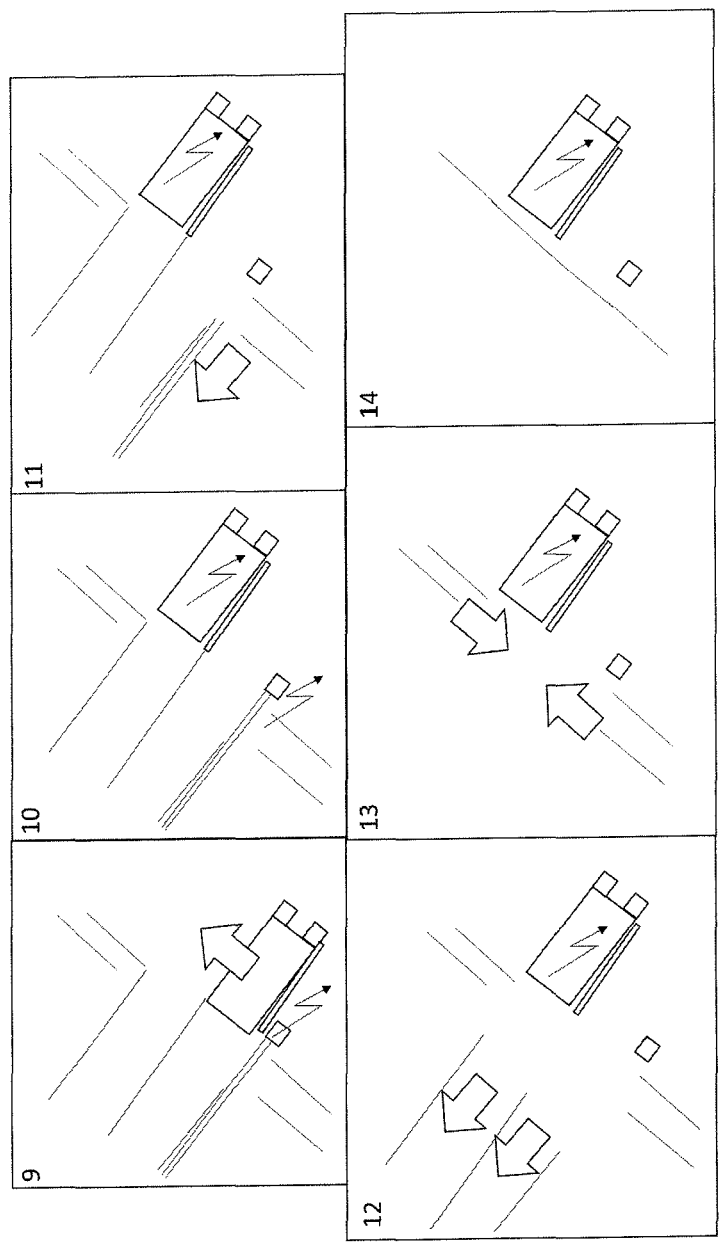

FIGS. 17a and 17b illustrate an exemplary method including a sequence of steps from the viewpoint of the electric aerial vehicle 104 which may be carried out with respect to a battery of the electric aerial vehicle 104, wherein battery replacement is performed using a conveyor arrangement 106 having a multiple paths for battery replacement. In step 1, when the area vehicle 104 is still on ground, a fresh battery may be inserted into a shelf in the battery bay of the electric aerial vehicle 102, wherein the shelf is in a first position. In step 2, the battery bay may be closed and, in step 3, the electric aerial vehicle 104 may take off and perform its dedicated airborne operations. In step 4, when the battery of the electric aerial vehicle 104 is to be replaced by a replacement battery from the aerial supply vehicle 102 (e.g., due to the battery becoming discharged), the battery bay of the electric aerial vehicle 104 may be opened during flight to enable docking the conveyor arrangement 106 (a "double pipe") to the electric aerial vehicle 104. In step 5, the conveyor arrangement may be docked to the electric aerial vehicle, wherein the power line from the aerial supply vehicle 102 may be connected to the electric aerial vehicle 104 to provide an external power source for the electric aerial vehicle 104 during the subsequent battery replacement. In step 6, the battery to be replaced may be unmounted and pulled out of the shelf in the battery bay to be conveyed via the conveyor arrangement 106 to the aerial supply vehicle 102. In step 7, the shelf may be moved in a second position within the battery bay. In step 8, a fresh battery may then be pushed from the aerial supply vehicle 102 via the conveyor arrangement 106 to the electric aerial vehicle 104 and may be mounted on the shelf accordingly. Also, it may be determined that the mechanical coupling between the conveyor unit and the battery is released. In step 9, the shelf may be moved together with the battery back to the first position and, in step 10, the newly inserted battery may be connected as new power source in the electric aerial vehicle 104. In step 11, the external power source may be disconnected. In step 12, the electric aerial vehicle 104 may undock from the conveyor arrangement 106 and, in step 13, the battery bay of the electric aerial vehicle 104 may be closed again. Finally, in step 14, the electric aerial vehicle may be fully operable again, having a fresh battery as its new power source.

Figure 18:
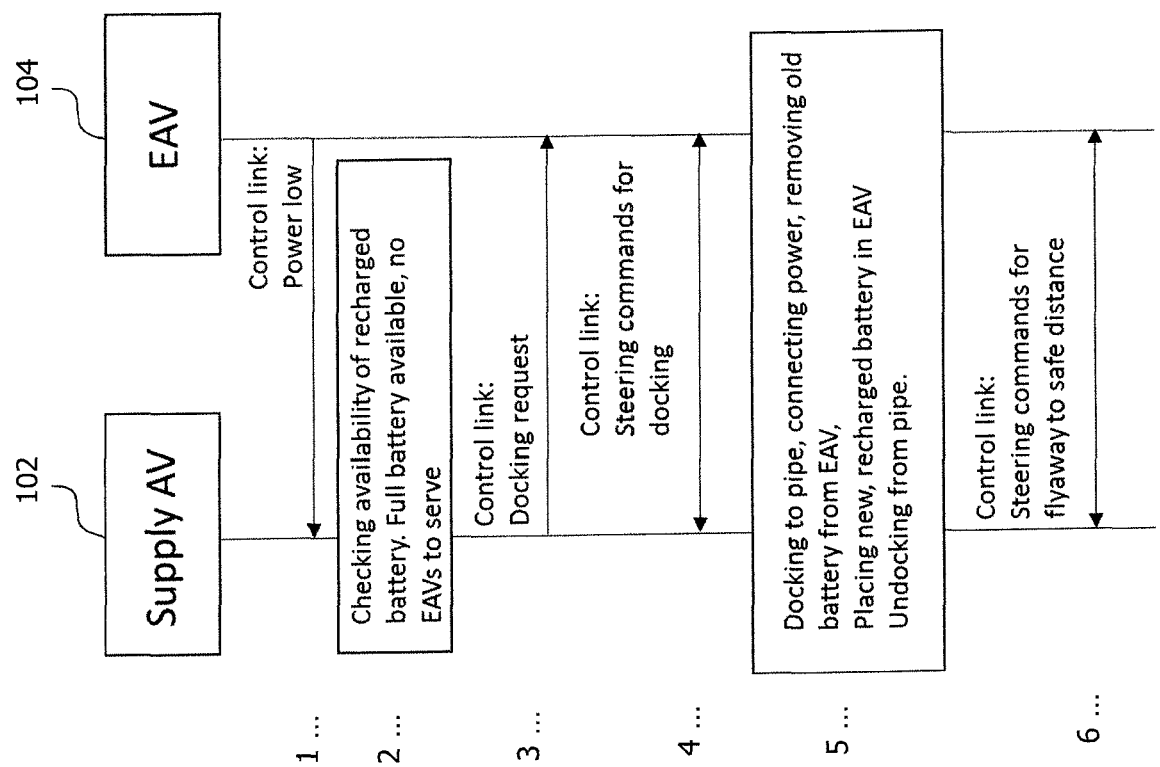
FIG. 18 illustrates a sequence diagram of an exemplary communication between an aerial supply vehicle and an electric aerial vehicle according to the present disclosure.

As explained above, the aerial supply vehicle 102 and the electric aerial vehicle 104 may support wireless connectivity allowing them to communicate with each other, e.g., to coordinate a procedure for battery replacement among each other. FIG. 18 illustrates a sequence diagram of an exemplary communication between the aerial supply vehicle 102 and the electric aerial vehicle 104 which includes preparing as well as conducting the actual replacement of a battery. In step 1 of the process, the electric aerial vehicle 104 may indicate via a (wireless) control link that battery power is low. In step 2, the aerial supply vehicle 102 may check the availability of fresh (recharged) batteries in the onboard store. If a fresh battery is available and no other electric aerial vehicles (potentially having a higher recharging priority than the electric aerial vehicle 104) are determined, the aerial supply vehicle 102 may send, via the control link, a docking request to the electric aerial vehicle 104. In step 4, the aerial supply vehicle 102 and the electric aerial vehicle 104 may exchange steering commands to coordinate their flight paths and velocity to allow docking the conveyor arrangement 106 therebetween. In step 5, the actual battery replacement may be carried out following one of the methods described above in relation to FIGS. 16a and 16b or FIGS. 17a and 17b, for example. Finally, in step 6, upon replacement of the battery, the aerial supply vehicle 102 and the electric aerial vehicle 104 may exchange steering commands to coordinate their flyaway to a safe distance, before they continue performing their own dedicated airborne operations again.

As has become apparent from the above, the present disclosure provides a conveyor arrangement for airborne battery replacement between an aerial supply vehicle and an electric aerial vehicle. The present disclosure also provides a corresponding system, an aerial supply vehicle and an electric aerial vehicle. Using the technique presented herein, discharged or low power batteries of electric aerial vehicles may be replaced during flight and the possible flight range of electric aerial vehicles may thus be greatly extended. By the gained energy improvement, electric aerial vehicles may not need to interrupt their operations to fly to a ground-based maintenance center to be recharged, as it may be typically done in conventional systems. With a whole swarm of aerial supply vehicles, large geographical areas may be covered, thereby enabling the provision of continuous network coverage of a mobile communication network over extensive geographical areas, e.g., using a whole swarm of DBSs that are continuously kept in the air, for example.

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only by the scope of the claims that follow.

The invention claimed is:

1. A conveyor arrangement for airborne battery replacement between an aerial supply vehicle having a store of replacement batteries suitable to power electric aerial vehicles and an electric aerial vehicle powered by a set of replaceable batteries, wherein the conveyor arrangement is configured to convey batteries between the aerial supply vehicle and the electric aerial vehicle during flight to replace a replaceable battery from the set of the electric aerial vehicle by a replacement battery from the store of replacement batteries of the aerial supply vehicle,
wherein the conveyor arrangement comprises a plurality of rollers subsequently arranged to form a flexible conveyor on which batteries can be conveyed, and
wherein the conveyor arrangement is further configured to convey batteries on the conveyor by a conveyor unit movable on the plurality of rollers, wherein the conveyor unit comprises an interface arrangement configured to releasably couple a battery to be conveyed to the conveyor unit.

2. The conveyor arrangement of claim 1, wherein the electric aerial vehicle is an unmanned aerial vehicle, UAV.

3. The conveyor arrangement of claim 2, wherein the UAV is a drone carrying a radio base station, RBS.

4. The conveyor arrangement of claim 1, wherein the conveyor arrangement is attachable to the aerial supply vehicle and extendable towards the electric aerial vehicle to dock the electric aerial vehicle to the aerial supply vehicle during flight.

5. The conveyor arrangement of claim 1, wherein the conveyor arrangement comprises a power line connectable between the aerial supply vehicle and the electric aerial vehicle during flight to supply the electric aerial vehicle with power from the aerial supply vehicle while performing battery replacement.

6. The conveyor arrangement of claim 1, wherein one side of the conveyor is used to convey batteries from the aerial supply vehicle to the electric aerial vehicle and the opposite side of the conveyor is used to convey batteries from the electric aerial vehicle to the aerial supply vehicle.

7. The conveyor arrangement of claim 1, wherein at least some of the plurality of rollers are driven using a gearwheel arrangement.

8. The conveyor arrangement of claim 7, wherein at least some gearwheels of the gearwheel arrangement are driven by force stimulated motors that are activated depending on a load applied on the conveyor.

9. The conveyor arrangement of claim 7, wherein the conveyor arrangement comprises at least one amplifier power circuit to amplify electric control signals delivered to motors that are distant over a threshold distance.

10. The conveyor arrangement of claim 7, wherein at least some gearwheels of the gearwheel arrangement are driven by a plurality of motors arranged along the conveyor.

11. The conveyor arrangement of claim 1, wherein the conveyor arrangement comprises an additional plurality of rollers subsequently arranged to form an at least two-sided conveyor with the plurality of rollers, wherein the at least two-sided conveyor grips conveyed batteries from at least two sides.

12. The conveyor arrangement of claim 1, wherein the conveyor arrangement comprises a winch and wherein the conveyor unit is moved along the plurality of rollers by means of a rope whose effective length is controllable by the winch.

13. The conveyor arrangement of claim 12, wherein the interface arrangement is electronically controllable to open or close a mechanical coupling of the conveyor unit to the battery to be conveyed.

14. The conveyor arrangement of claim 13, wherein electronic control signals are delivered to the interface arrangement using a conductor made by at least one of:
a cable running along the rope, and
a rail installed along the conveyor so as to provide a sliding contact to the conveyor unit as the conveyor unit moves along the conveyor.

15. The conveyor arrangement of claim 14, wherein the conductor is made redundantly by the cable and the rail, wherein a failover mechanism is provided that switches delivery of the electronic control signals from one of the cable and the rail to the other one of the cable and the rail in case of failure of the one of the cable and the rail.

16. The conveyor arrangement of claim 13, wherein a detector circuit configured to detect a closed state of the mechanical coupling is provided.

17. The conveyor arrangement of claim 16, wherein the detector circuit is provided as part of the interface arrangement and wherein power for the detector circuit is supplied from the aerial supply vehicle.

18. The conveyor arrangement of claim 16, wherein one part of the detector circuit is provided in the interface arrangement and another part of the detector circuit is provided in the battery to be conveyed, wherein the detector circuit becomes closed when the mechanical coupling between the conveyor unit and the battery is closed.

19. The conveyor arrangement of claim 16, wherein the detector circuit is provided as part of the battery to be conveyed and wherein power for the detector circuit is supplied from the battery.

20. An aerial supply vehicle having a store of replacement batteries suitable to power electric aerial vehicles, wherein the aerial supply vehicle is configured to perform airborne battery replacement using a conveyor arrangement of claim 1.

* * * * *